United States Patent
Li et al.

(10) Patent No.: US 12,342,409 B2
(45) Date of Patent: Jun. 24, 2025

(54) SIDELINK DISCONTINUOUS RECEPTION TIMER OPERATIONS

(71) Applicant: QUALCOMM Incorporated, San Diego, CA (US)

(72) Inventors: Qing Li, Princeton Junction, NJ (US); Hong Cheng, Basking Ridge, NJ (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 604 days.

(21) Appl. No.: 17/645,603

(22) Filed: Dec. 22, 2021

(65) Prior Publication Data

US 2022/0287143 A1    Sep. 8, 2022

Related U.S. Application Data

(60) Provisional application No. 63/158,251, filed on Mar. 8, 2021.

(51) Int. Cl.
*H04W 76/28* (2018.01)
*H04L 1/1812* (2023.01)
(Continued)

(52) U.S. Cl.
CPC .......... *H04W 76/28* (2018.02); *H04L 1/1812* (2013.01); *H04L 5/0055* (2013.01); *H04W 72/20* (2023.01)

(58) Field of Classification Search
CPC . H04W 76/28; H04W 72/20; H04W 52/0216; H04W 52/0245; H04W 76/14;
(Continued)

(56) References Cited

U.S. PATENT DOCUMENTS

2022/0015186 A1*  1/2022  Jeong .................... H04L 1/1816
2022/0256625 A1*  8/2022  Park ....................... H04W 52/02
(Continued)

FOREIGN PATENT DOCUMENTS

CN   111699723 A   9/2020
EP   3499975 A1   6/2019

OTHER PUBLICATIONS

3GPP TS 38.321: "3rd Generation Partnership Project, Technical Specification Group Radio Access Network, NR, Medium Access Control (MAC) Protocol Specification (Release 16)", 3GPP Standard, Technical Specification, 3rd Generation Partnership Project (3GPP), Mobile Competence Centre, 650, Route Des Lucioles, F-06921 Sophia-Antipolis Cedex, France, vol. RAN WG2, No. V16.3.0 (Dec. 2020), Jan. 6, 2021 (Jan. 6, 2021), pp. 1-156, XP051999701, Retrieved from the Internet: URL: https://ftp.3gpp.org/Specs/archive/38_series/38.321/38321-g30.zip 38321-g30.docx [retrieved on Jan. 6, 2021] section 1, section 5.1, chapters 5.7, 5.22, paragraph 5.15.

(Continued)

*Primary Examiner* — Ricky Q Ngo
*Assistant Examiner* — David M Kayal
(74) *Attorney, Agent, or Firm* — Harrity & Harrity, LLP

(57)  ABSTRACT

Various aspects of the present disclosure generally relate to wireless communication. In some aspects, a transmitting (Tx) user equipment (UE) may perform, to a receiving (Rx) UE, a first sidelink transmission in an on duration of a sidelink discontinuous reception (DRX) cycle associated with a sidelink DRX configuration. The Tx may activate a sidelink DRX timer based at least in part on the sidelink DRX configuration, wherein the sidelink DRX configuration is associated with a destination identifier (ID) and one or more source IDs are associated with the destination ID, and wherein the sidelink DRX timer is operated per a pair of (Continued)

source ID and destination ID. Numerous other aspects are described.

30 Claims, 11 Drawing Sheets

(51) Int. Cl.
*H04L 5/00* (2006.01)
*H04W 72/20* (2023.01)

(58) Field of Classification Search
CPC ....... H04W 76/38; H04W 4/08; H04W 72/25; H04W 76/11; H04W 92/10; H04W 92/18; H04L 1/1812; H04L 5/0055; H04L 2001/0093; H04L 1/1848; H04L 1/1883
See application file for complete search history.

(56) References Cited

U.S. PATENT DOCUMENTS

| | | | | |
|---|---|---|---|---|
| 2022/0346011 A1* | 10/2022 | Hong | .................... | H04W 52/02 |
| 2022/0394814 A1* | 12/2022 | Liu | ........................ | H04W 24/02 |
| 2023/0014303 A1* | 1/2023 | Di Girolamo | ........ | H04W 72/20 |
| 2023/0063472 A1* | 3/2023 | Freda | .................... | H04W 76/28 |
| 2023/0068554 A1* | 3/2023 | Yang | ................ | H04W 52/0216 |
| 2023/0104340 A1* | 4/2023 | Park | .................. | H04W 52/0216 |
| | | | | 370/329 |
| 2023/0345575 A1* | 10/2023 | Ko | ........................ | H04W 76/28 |
| 2023/0397292 A1* | 12/2023 | Park | ..................... | H04W 72/25 |

OTHER PUBLICATIONS

International Search Report and Written Opinion—PCT/US2022/070380—ISA/EPO—May 11, 2022.
LG Electronics Inc: "Discussion on Sidelink Drx", 3GPP Draft, R2-2100637, 3GPP TSG-RAN WG2 Meeting #113 electronic, 3rd Generation Partnership Project (3GPP), Mobile Competence Centre, 650, Route Des Lucioles, F-06921, Sophia-Antipolis Cedex, France, vol. RAN WG2, no. electronic, Jan. 25, 2021-Feb. 5, 2021, Jan. 15, 2021 (Jan. 15, 2021), XP051973761, pp. 1-6, Retrieved from the Internet: URL: https://ftp.3gpp.org/tsg_ran/WG2_RL2/TSGR2_113-e/Docs/R2-2100637.zip R2-2100637—Discussion on Sidelink DRX.DOCX [retrieved on Jan. 15, 2021] chapters 1-2.6, 3.
LG Electronics Inc: "Discussion on Sidelink DRX Timer", 3GPP Draft, R2-2100638, 3GPP TSG-RAN WG2 Meeting #113 electronic, 3rd Generation Partnership Project (3GPP), Mobile Competence Centre, 650, Route Des Lucioles, F-06921, Sophia-Antipolis Cedex, France, vol. RAN WG2, no. electronic, Jan. 25, 2021-Feb. 5, 2021, Jan. 15, 2021 (Jan. 15, 2021), XP051973762, pp. 1-4, Retrieved from the Internet: URL:https://ftp.3gpp.org/tsg_ran/WG2_RL2/TSGR2_113-e/Docs/R2-2100638.zip R2-2100638—Discussion on Sidelink DRX Timer.DOCX [retrieved on Jan. 15, 2021] chapters 1-3.
Vivo: "Drx Alignment Between TX and RX UEs", 3GPP Draft, R2-2100796, 3GPP TSG-RAN WG2 Meeting #113 electronic, 3rd Generation Partnership Project (3GPP), Mobile Competence Centre, 650, Route Des Lucioles, F-06921, Sophia-Antipolis Cedex, France, vol. RAN WG2, no. electronic, Jan. 25, 2021-Feb. 5, 2021, Jan. 15, 2021 (Jan. 15, 2021), XP051973903, 6 Pages, Retrieved from the Internet: URL: https://ftp.3gpp.org/tsg_ran/WG2_RL2/TSGR2_113-e/Docs/R2-2100796.zip, R2-2100796 DRX Alignment between TX and RX UEs.doc [retrieved on Jan. 15, 2021] chapters 1-3, the whole document.
Vivo: "SL DRX for Groupcast Broadcast and Unicast", 3GPP Draft, R2-2009833, 3GPP TSG-RAN WG2 Meeting #112 electronic, 3rd Generation Partnership Project (3GPP), Mobile Competence Centre, 650, Route Des Lucioles, F-06921, Sophia-Antipolis Cedex, France, vol. RAN WG2, No. electronic, Nov. 2, 2020-Nov. 13, 2020, Oct. 23, 2020 (Oct. 23, 2020), XP051942647, 5 Pages, Retrieved from the Internet: URL: https://ftp.3gpp.org/tsg_ran/WG2_RL2/TSGR2_112-e/Docs/R2-2009833.zip R2-2009833 SL DRX. doc [retrieved on Oct. 23, 2020] chapters 1-3.

* cited by examiner

SIDELINK DISCONTINUOUS RECEPTION TIMER OPERATIONS

CROSS-REFERENCE TO RELATED APPLICATION

This Patent application claims priority to U.S. Provisional Patent Application No. 63/158,251, filed on Mar. 8, 2021, entitled "SIDELINK DISCONTINUOUS RECEPTION TIMER OPERATIONS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for sidelink discontinuous reception (DRX) timer operations.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a transmitting (Tx) UE includes performing, to a receiving (Rx) UE, a first sidelink transmission in an on duration of a sidelink discontinuous reception (DRX) cycle associated with a sidelink DRX configuration; and activating a sidelink DRX timer based at least in part on the sidelink DRX configuration, wherein the sidelink DRX configuration is associated with a destination identifier (ID) and one or more source IDs are associated with the destination ID, and wherein the sidelink DRX timer is operated per a pair of source ID and destination ID.

In some aspects, a method of wireless communication performed by an Rx UE includes receiving, from a Tx UE, a first sidelink transmission in an on duration of a sidelink DRX cycle associated with a sidelink DRX configuration; and activating a sidelink DRX timer based at least in part on the sidelink DRX configuration, wherein the sidelink DRX configuration is associated with a destination ID and one or more source IDs are associated with the destination ID, and wherein the sidelink DRX timer is operated per a pair of source ID and destination ID.

In some aspects, a method of wireless communication performed by a first UE includes performing, to a second UE, a sidelink transmission in an on duration of a sidelink DRX cycle associated with a sidelink DRX configuration; and activating a sidelink DRX timer based at least in part on the sidelink DRX configuration, wherein the sidelink DRX configuration is associated with a quality of service (QoS) profile, and wherein the sidelink DRX timer is operated per destination ID and per each source ID associated with the destination ID.

In some aspects, a Tx UE for wireless communication includes a memory and one or more processors, coupled to the memory, configured to: perform, to an Rx UE, a first sidelink transmission in an on duration of a sidelink DRX cycle associated with a sidelink DRX configuration; and activate a sidelink DRX timer based at least in part on the sidelink DRX configuration, wherein the sidelink DRX configuration is associated with a destination ID and one or more source IDs are associated with the destination ID, and wherein the sidelink DRX timer is operated per a pair of source ID and destination ID.

In some aspects, an Rx UE for wireless communication includes a memory and one or more processors, coupled to the memory, configured to: receive, from a Tx UE, a first sidelink transmission in an on duration of a sidelink DRX cycle associated with a sidelink DRX configuration; and activate a sidelink DRX timer based at least in part on the sidelink DRX configuration, wherein the sidelink DRX configuration is associated with a destination ID and one or more source IDs are associated with the destination ID, and wherein the sidelink DRX timer is operated per a pair of source ID and destination ID.

In some aspects, a first UE for wireless communication includes a memory and one or more processors, coupled to the memory, configured to: perform, to a second UE, a sidelink transmission in an on duration of a sidelink DRX cycle associated with a sidelink DRX configuration; and activate a sidelink DRX timer based at least in part on the sidelink DRX configuration, wherein the sidelink DRX configuration is associated with a QoS profile, and wherein the sidelink DRX timer is operated per destination ID and per each source ID associated with the destination ID.

In some aspects, a non-transitory computer-readable medium storing a set of instructions for wireless communication includes one or more instructions that, when executed by one or more processors of a Tx UE, cause the Tx UE to: perform, to an Rx UE, a first sidelink transmission in an on duration of a sidelink DRX cycle associated with a sidelink DRX configuration; and activate a sidelink DRX timer based at least in part on the sidelink DRX configuration, wherein the sidelink DRX configuration is associated with a destination ID and one or more source IDs are associated with the destination ID, and wherein the sidelink DRX timer is operated per a pair of source ID and destination ID.

In some aspects, a non-transitory computer-readable medium storing a set of instructions for wireless communication includes one or more instructions that, when executed by one or more processors of an Rx UE, cause the Rx UE to: receive, from a Tx UE, a first sidelink transmission in an on duration of a sidelink DRX cycle associated with a sidelink DRX configuration; and activate a sidelink DRX timer based at least in part on the sidelink DRX configuration, wherein the sidelink DRX configuration is associated with a destination ID and one or more source IDs are associated with the destination ID, and wherein the sidelink DRX timer is operated per a pair of source ID and destination ID.

In some aspects, a non-transitory computer-readable medium storing a set of instructions for wireless communication includes one or more instructions that, when executed by one or more processors of a first UE, cause the first UE to: perform, to a second UE, a sidelink transmission in an on duration of a sidelink DRX cycle associated with a sidelink DRX configuration; and activate a sidelink DRX timer based at least in part on the sidelink DRX configuration, wherein the sidelink DRX configuration is associated with a QoS profile, and wherein the sidelink DRX timer is operated per destination ID and per each source ID associated with the destination ID.

In some aspects, a transmitting apparatus for wireless communication includes means for performing, to a receiving apparatus, a first sidelink transmission in an on duration of a sidelink DRX cycle associated with a sidelink DRX configuration; and means for activating a sidelink DRX timer based at least in part on the sidelink DRX configuration, wherein the sidelink DRX configuration is associated with a destination ID and one or more source IDs are associated with the destination ID, and wherein the sidelink DRX timer is operated per a pair of source ID and destination ID.

In some aspects, a receiving apparatus for wireless communication includes means for receiving, from a transmitting apparatus, a first sidelink transmission in an on duration of a sidelink DRX cycle associated with a sidelink DRX configuration; and means for activating a sidelink DRX timer based at least in part on the sidelink DRX configuration, wherein the sidelink DRX configuration is associated with a destination ID and one or more source IDs are associated with the destination ID, and wherein the sidelink DRX timer is operated per a pair of source ID and destination ID.

In some aspects, a first apparatus for wireless communication includes means for performing, to a second apparatus, a sidelink transmission in an on duration of a sidelink DRX cycle associated with a sidelink DRX configuration; and means for activating a sidelink DRX timer based at least in part on the sidelink DRX configuration, wherein the sidelink DRX configuration is associated with a QoS profile, and wherein the sidelink DRX timer is operated per destination ID and per each source ID associated with the destination ID.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
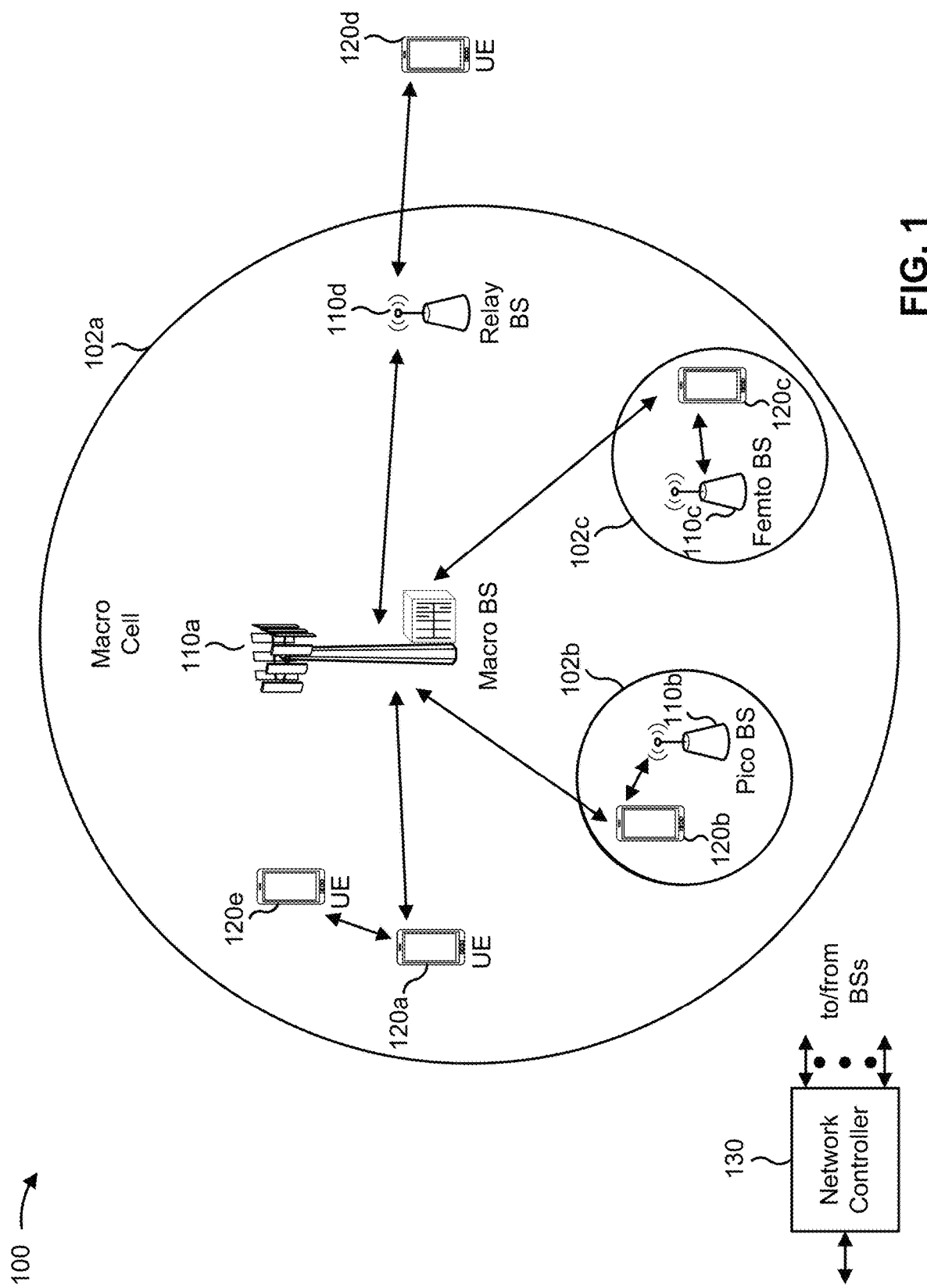
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
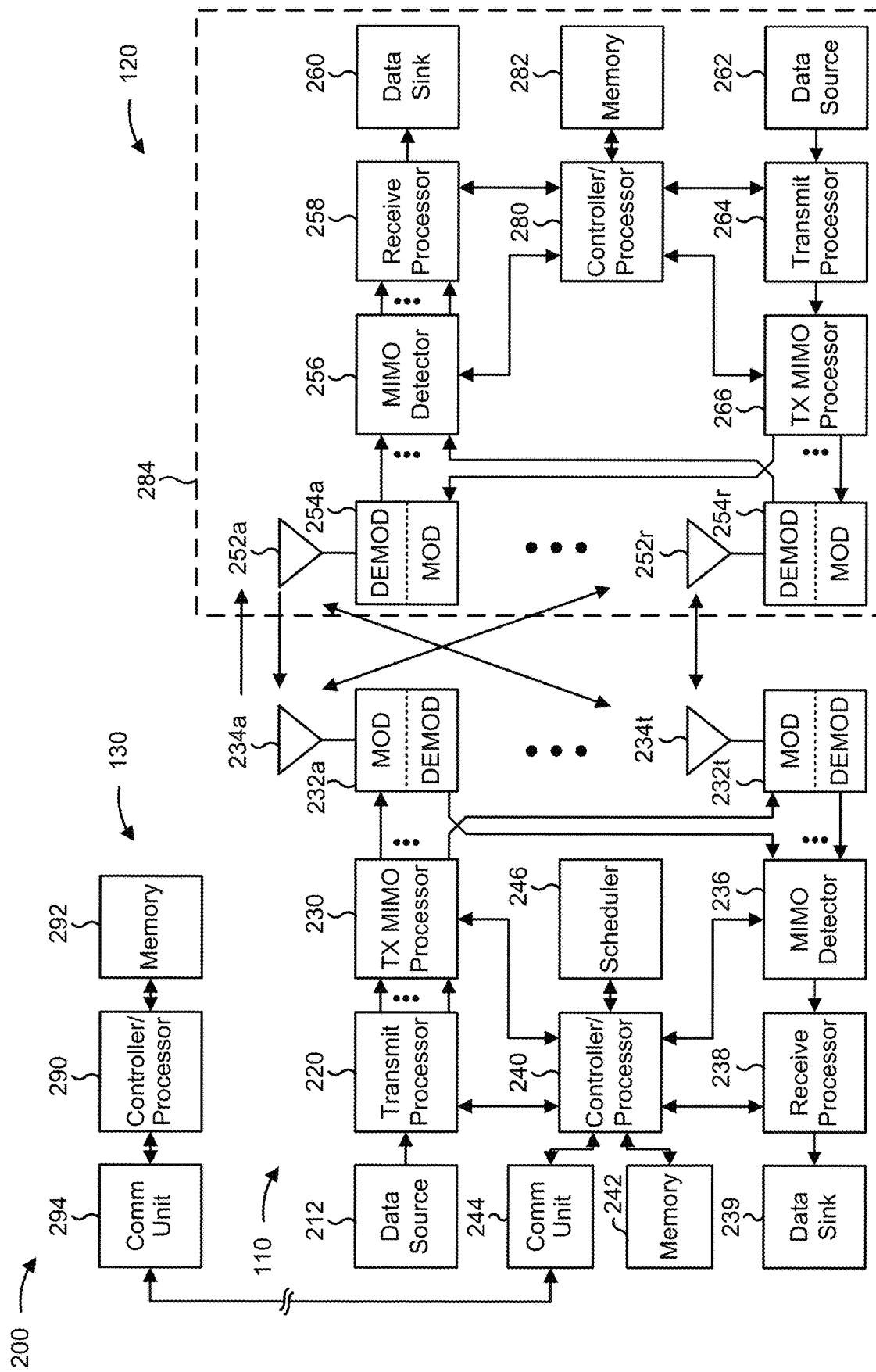
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-7).

The controller/processor 240 of the base station 110, the controller/processor 280 of the UE 120, and/or any other component(s) of FIG. 2 may perform one or more techniques associated with sidelink DRX timer operations, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a Tx UE (e.g., 120*a*) includes means for performing, to an Rx UE (e.g., 120*e*), a first sidelink transmission in an on duration of a sidelink DRX cycle associated with a sidelink DRX configuration; and/or means for activating a sidelink DRX timer based at least in part on the sidelink DRX configuration, wherein the sidelink DRX configuration is associated with a destination ID and one or more source IDs are associated with the destination ID, and wherein the sidelink DRX timer is operated per a pair of source ID and destination ID. The means for the Tx UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the Tx UE includes means for receiving, from the Rx UE, a negative acknowledgement (NACK) based at least in part on the first sidelink transmission; or In some aspects, the Tx UE includes means for switching to an inactive state for sidelink communications while a hybrid automatic repeat request (HARQ) round trip time (RTT) timer is running.

In some aspects, the Tx UE includes means for determining, while the HARQ retransmission timer is running, a reselected resource for a second sidelink transmission reserved by sidelink control information (SCI) transmitted with the first sidelink transmission, wherein the reselected resource is before or after in time an originally reserved resource associated with the SCI.

In some aspects, the Tx UE includes means for performing, to the Rx UE, the second sidelink transmission, wherein the HARQ retransmission timer is deactivated after the second sidelink transmission is performed.

In some aspects, an Rx UE (e.g., 120*e*) includes means for receiving, from a Tx UE (e.g., 120*a*), a first sidelink transmission in an on duration of a sidelink DRX cycle associated with a sidelink DRX configuration; and/or means for activating a sidelink DRX timer based at least in part on the sidelink DRX configuration, wherein the sidelink DRX configuration is associated with a destination ID and one or more source IDs are associated with the destination ID, and wherein the sidelink DRX timer is operated per a pair of source ID and destination ID. The means for the Rx UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the Rx UE includes means for transmitting, to the Tx UE, a NACK based at least in part on the first sidelink transmission; or In some aspects, the Rx UE includes means for switching to an inactive state for sidelink communications while the HARQ RTT timer is running.

In some aspects, the Rx UE includes means for monitoring, while the HARQ retransmission timer is running, for a scheduling sidelink control information for a second sidelink transmission.

In some aspects, the Rx UE includes means for deactivating the HARQ retransmission timer after receiving the second sidelink transmission from the Tx UE.

In some aspects, the Rx UE includes means for transmitting, to the Tx UE, an acknowledgement (ACK) based at least in part on the first sidelink transmission; or In some aspects, a first UE (e.g., 120*a* or UE 120*e*) includes means for performing, to a second UE (e.g., UE 120*e* or UE 120*a*), a sidelink transmission in an on duration of a sidelink DRX cycle associated with a sidelink DRX configuration; and/or means for activating a sidelink DRX timer based at least in part on the sidelink DRX configuration, wherein the sidelink DRX configuration is associated with a QoS profile, and wherein the sidelink DRX timer is operated per destination ID and per each source ID associated with the destination ID. The means for the first UE to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

In Uu DRX, DRX may be defined for Uu interfaces between UEs and base stations. A Uu DRX may be configured for each UE. In other words, a Uu DRX may be UE-specific for unicast communications (e.g., uplink and downlink communications) between a UE and a base station. Uu DRX timers may include a DRX inactivity timer (e.g., drx-InactivityTimer), which may be operated per each grant addressed to a radio network temporary identifier (RNTI). The Uu DRX timers may also include a DRX retransmission timer in downlink (e.g., drx-RetransmissionTimerDL), a DRX retransmission timer in uplink (e.g., drx-RetransmissionTimerUL), a DRX HARQ RTT timer in downlink (e.g., drx-HARQ-RTT-TimerDL), and/or a DRX HARQ RTT timer in uplink (e.g., HARQ-RTT-TimerUL), which may be configured per each HARQ process.

A sidelink HARQ entity may be associated with multiple parallel sidelink HARQ processes, of which each sidelink HARQ process may be associated with ID information carried on SCI, such as a pair of a source ID and a destination ID.

When Uu DRX timer operations are adopted as a baseline for sidelink DRX, sidelink DRX timers may be associated with a grant (e.g., an inactivity timer) or a sidelink process of a HARQ entity (e.g., a HARQ RTT timer and a HARQ retransmission timer), where each sidelink process may be associated with IDs indicated in sidelink control information part 2 (SCI2), which may be associated to a sidelink grant indicated in sidelink control information part 1 (SCI1). Therefore, sidelink DRX timers may be operated per a sidelink grant or per a sidelink HARQ process defined by a pair of source ID and destination ID.

One problem is that when a sidelink DRX is configured per a Layer 2 destination ID for identifying a group for groupcast or identifying a service for broadcast, multiple source IDs (e.g., Tx UEs) may be associated with a destination ID (e.g., a group or service), since a UE (e.g., any UE) participating in the group or service may perform transmissions. When the sidelink DRX is configured per the Layer 2 destination ID, sidelink DRX timers may need to be configured to be operated with multiple source IDs for groupcast or broadcast.

Another problem is that when a sidelink DRX is configured per QoS profile or PC5 QoS identifier (PQI) and a group or service supports only one unique QoS profile or PQI value, then the group or service may be configured with one sidelink DRX corresponding to an associated QoS profile or PQI with multiple source IDs (e.g., Tx UEs). Another problem is that when the sidelink DRX is configured per QoS profile or PQI and the group or service supports multiple QoS profiles or PQIs, then the group or service may be configured with multiple sidelink DRXs corresponding to multiple QoS profiles or PQIs respectively. In this case, a UE of the group or service may need to support multiple sidelink DRX operations. However, when multiple groupcasts or broadcasts have the same PQI, the same sidelink DRX corresponding the QoS profile or PQI may be configured. Thus, timers may be associated to different grants for different groups or services, e.g., associated with multiple pairs of source IDs (e.g., Tx UEs) and destination IDs (e.g., groups or services). When the sidelink DRX is configured per QoS profile or PQI, sidelink DRX timers may need to be configured to be operated with multiple groupcasts or broadcasts sharing the same sidelink DRX for the QoS profile or PQI.

In various aspects of techniques and apparatuses described herein, a UE (e.g., a Tx UE or an Rx UE) may activate a sidelink DRX timer based at least in part on a sidelink DRX configuration. The sidelink DRX timer may be an inactivity timer, a HARQ RTT timer, or a HARQ retransmission timer. The sidelink DRX configuration may be associated with a destination ID for a groupcast or broadcast and one or more source IDs associated to one or more Tx UEs may be associated with the destination ID for the groupcast or broadcast. The sidelink DRX timer may be operated per source ID in the multiple source IDs associated to a destination ID for a groupcast or broadcast, or, in another words, per a pair of source ID and destination ID for a groupcast or broadcast.

In some aspects, with respect to sidelink DRX timers for a groupcast, the inactivity timer may be operated per each Tx UE when a reserved transmission or a retransmission occasion is outside of a current sidelink DRX on duration. The inactivity timer may also be operated to support resource reselection for retransmissions or new transmissions. In some aspects, the HARQ RTT timer and the HARQ retransmission timer may be operated per each Tx UE within a group when HARQ is enabled for the transmission. The Rx UE may deactivate or activate the HARQ RTT timer after successfully decoding a packet or not (i.e., an ACK or NACK).

In some aspects, with respect to sidelink DRX timers for a broadcast, the inactivity timer may be operated per each Tx UE when a reserved transmission or a retransmission occasion is outside of a current sidelink DRX on duration, and/or when a resource reselection is enabled. The inactivity timer may also be operated to support resource reselection for retransmissions or new transmissions.

Figure 3:
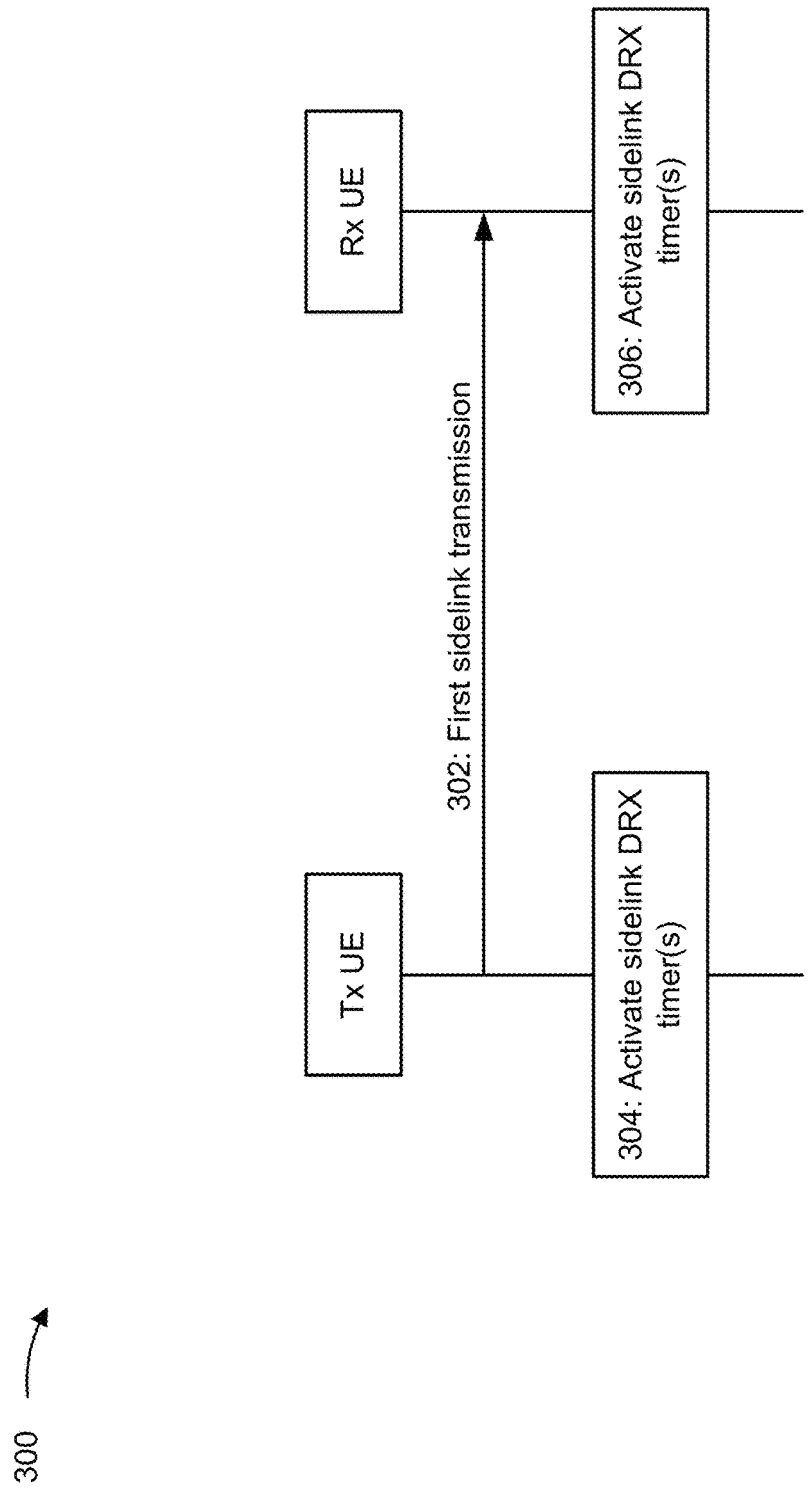
FIGS. 3-7 are diagrams illustrating examples associated with sidelink discontinuous reception (DRX) timer operations, in accordance with the present disclosure.

FIG. 3 is a diagram illustrating an example 300 associated with sidelink DRX timer operations, in accordance with the present disclosure. As shown in FIG. 3, example 300 includes communication between a Tx UE (e.g., UE 120a) and an Rx UE(s) (e.g., UE(s) 120e) for a groupcast or a broadcast wherein, at a time, a UE may be a Tx UE and the other UE(s) may be Rx UE(s). In some aspects, the Tx UE and the Rx UE(s) may be included in a wireless network such as wireless network 100. The Tx UE and the Rx UE(s) may communicate on a wireless sidelink with a groupcast or broadcast.

In some aspects, sidelink DRX may allow sidelink UEs to be in a low power mode when no sidelink communications are being performed by the sidelink UEs. Sidelink DRX may be associated with various sidelink DRX timers. For example, a sidelink DRX cycle may refer to one ON time and on OFF time. An on duration timer may refer to a duration of ON time within one DRX cycle. An inactivity timer may refer to a duration that a sidelink UE should remain "ON" after receiving a sidelink resource reservation indicated in an SCI transmitted with an initial transmission. A HARQ RTT timer specifies a minimum duration before a HARQ retransmission may be expected by the sidelink UE. A HARQ retransmission timer may indicate a maximum duration that the sidelink UE should remain active to wait for a retransmission.

As shown by reference number 302, the Tx UE may perform, to the Rx UE(s), a first sidelink transmission in an on duration of a sidelink DRX cycle associated with a sidelink DRX configuration for a groupcast or broadcast. The Tx UE may perform the first sidelink transmission via a sidelink interface between the Tx UE and the Rx UE(s).

As shown by reference number 304, the Tx UE may activate a sidelink DRX timer based at least in part on the sidelink DRX configuration. The sidelink DRX configuration may be associated with a destination ID, and one or more source IDs may be associated with the destination ID. The sidelink DRX timer may be operated per source ID in the one or more source IDs. In some aspects, the destination ID may be a layer 2 destination ID for a groupcast. In some aspects, the source ID in the one or more source IDs may be associated with the Tx UE, and the multiple source IDs may correspond to multiple Tx UEs associated with the destination ID for the groupcast. In some aspects, the Rx UE may be one of multiple Rx UEs associated with the destination ID for the groupcast.

In some aspects, the Tx UE may activate an on duration timer based at least in part on entering the on duration of the sidelink DRX cycle. In some aspects, the Tx UE may activate the inactivity timer based at least in part on a reserved sidelink transmission or a new sidelink transmission, as indicated in SCI of the first sidelink transmission, being outside of the on duration of the sidelink DRX cycle. In some aspects, the inactivity timer may be deactivated based at least in part on the reserved sidelink transmission or the new sidelink transmission, as indicated in the SCI of the first sidelink transmission, being within the on duration of the sidelink DRX cycle.

In some aspects, the Tx UE may receive, from the Rx UE, a NACK based at least in part on the first sidelink transmission. The Tx UE may activate a HARQ RTT timer based at least in part on the NACK. In some aspects, the Tx UE may switch to an inactive state for sidelink communications while the HARQ RTT timer is running. In some aspects, a resource reselection may not be triggered based at least in part on a preemption, a dropped transmission, or a collision detection while the HARQ RTT timer is running. In some aspects, a value associated with the HARQ RTT timer may be based at least in part on the Tx UE capability or is a common value for a plurality of UEs with a groupcast. In some aspects, the Tx UE may stop the inactivity timer when activating the HARQ RTT timer, and then the inactivity timer may be activated after transmitting or receiving another SCI with a resource selected or reserved for another transmission or retransmission.

In some aspects, the Tx UE may activate a HARQ retransmission timer based at least in part on an expiry of the HARQ RTT timer. In some aspects, the Tx UE may determine, while the HARQ retransmission timer is running, a reselected resource for a second sidelink transmission reserved by SCI transmitted with the first sidelink transmission. The reselected resource may be before or after in time an originally reserved resource indicated by the SCI transmitted with the first sidelink transmission. In some aspects, the Tx UE may perform, to the Rx UE, the second sidelink transmission. The HARQ retransmission timer may be deactivated after the second sidelink transmission is performed.

In some aspects, the destination ID may be a layer 2 destination ID for a broadcast service. In some aspects, the Tx UE may activate the inactivity timer after performing the first sidelink transmission that reserves the second sidelink transmission. In some aspects, the Tx UE may activate the inactivity timer based at least in part on a resource reselection for a retransmission or a new transmission being enabled.

As shown by reference number 306, the Rx UE may activate, after receiving the first sidelink transmission, a sidelink DRX timer based at least in part on a sidelink DRX configuration. The sidelink DRX configuration may be associated with the destination ID, and the one or more source IDs may be associated with the destination ID. The sidelink DRX timer may be operated per source ID in the one or more source IDs.

In some aspects, the destination ID may be a layer 2 destination ID for a groupcast. In some aspects, the source ID in the multiple source IDs may be associated with the Tx UE, and the multiple source IDs may correspond to multiple Tx UEs associated with the destination ID for the groupcast.

In some aspects, the Rx UE may activate the on duration timer based at least in part on entering the on duration of the sidelink DRX cycle. In some aspects, the Rx UE may activate the inactivity timer based at least in part on a reserved sidelink transmission or a new sidelink transmission, as indicated in SCI of the first sidelink transmission, is outside of the on duration of the sidelink DRX cycle.

In some aspects, the Rx UE may transmit, to the Tx UE, a NACK based at least in part on the first sidelink transmission. The Rx UE may activate the HARQ RTT timer based at least in part on the NACK. In some aspects, the Rx UE may switch to an inactive state for sidelink communications while the HARQ RTT timer is running. In some aspects, a value associated with the HARQ RTT timer may be based at least in part on an Rx UE capability or is a common value for a plurality of UEs with a groupcast. In some aspects, the Rx UE may stop the inactivity timer to activate the HARQ RTT timer. and then the inactivity timer may be activated after transmitting or receiving another SCI with a resource selected or reserved for another transmission or retransmission.

In some aspects, the Rx UE may activate a HARQ retransmission timer based at least in part on an expiry of the HARQ RTT timer. In some aspects, the Rx UE may monitor, while the HARQ retransmission timer is running, for a scheduling sidelink control information for a second sidelink transmission. In some aspects, the Rx UE may deactivate the HARQ retransmission timer after receiving the second sidelink transmission from the Tx UE.

In some aspects, the Rx UE may transmit, to the Tx UE, an ACK based at least in part on the first sidelink transmission. The Rx UE may activate the HARQ RTT timer based at least in part on the ACK. In some aspects, the HARQ RTT timer may be deactivated based at least in part on the ACK.

In some aspects, the destination ID may be a layer 2 destination ID for a broadcast service. In some aspects, the Rx UE may activate the inactivity timer after receiving, from the Tx UE, the first sidelink transmission that reserves a second sidelink transmission.

In some aspects, the Tx UE or the Rx UE may activate, after the sidelink transmission, the sidelink DRX timer based at least in part on the sidelink DRX configuration. The sidelink DRX configuration may be associated with QoS profile or PQI. The sidelink DRX timer may be operated per destination ID and per each source ID associated with the destination ID. In some aspects, the QoS profile or PQI may correspond to multiple groups for groupcast or multiple services for broadcast. The Tx UE and/or the Rx UE may be configured with the sidelink DRX configuration corresponding to the QoS profile or PQI for the multiple groups for groupcast or the multiple services for broadcast. In some aspects, the destination ID may be associated with a group for groupcast or a service for broadcast. In some aspects, the source ID is associated with the Tx UE for a groupcast or broadcast wherein, at a time, a UE may be a Tx UE and the other UE(s) may be Rx UE(s).

As indicated above, FIG. 3 is provided as an example. Other examples may differ from what is described with regard to FIG. 3.

Figure 4:
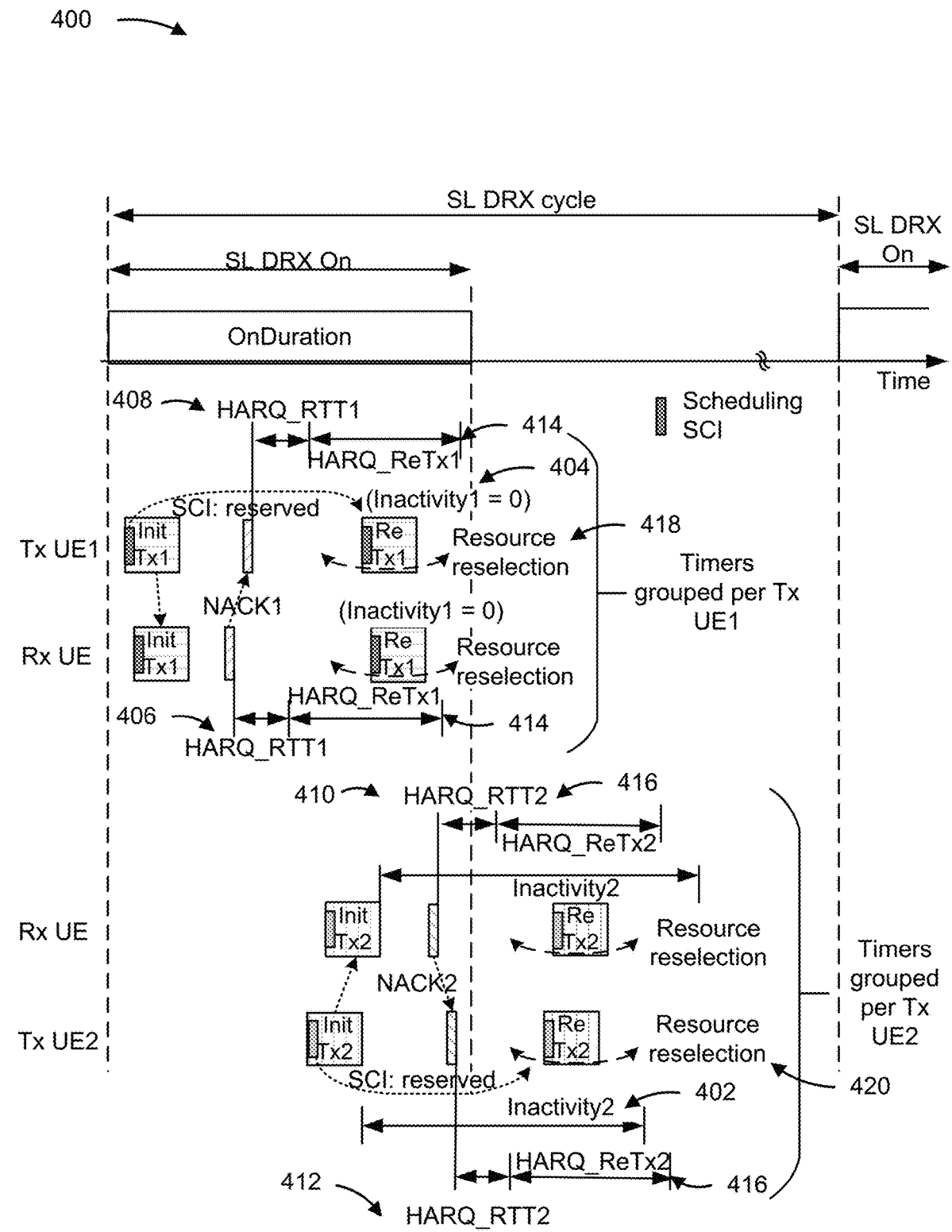

FIG. 4 is a diagram illustrating an example 400 associated with sidelink DRX timer operations, in accordance with the present disclosure.

As shown in FIG. 4, a sidelink DRX cycle may include a sidelink DRX on duration and a sidelink DRX cycle length, as well as an offset (not shown in the figure) for a start of the on duration. A sidelink DRX configured for a groupcast, e.g., for a destination ID associated to a group, may contain a timer for the on duration, an inactivity timer for extending an active state of the on duration, and/or a pair of timers for HARQ feedback based retransmission (e.g., a HARQ RTT timer and a HARQ retransmission timer), if enabled.

The timer for the on duration and the inactivity timer may each be set with a value for a group or service, e.g., for a destination ID, so that a plurality of UEs of a group, e.g., associated to a destination ID, may be synchronized with the same active state setting for a sidelink DRX cycle.

The HARQ RTT timer may be configured per each UE's capability or configured with a common value for a plurality of UEs (e.g., all UEs) of a group for synchronizing HARQ RTT operation among the UEs of the group.

The HARQ retransmission timer may be configured with one or multiple values based on QoS requirements (e.g., latency, reliability, or priority). For example, a shorter HARQ retransmission timer may be configured for short latency transmissions.

Multiple Tx UEs (e.g., Tx UE1 and Tx UE2) may transmit, at different times, to a same Rx UE(s) for a groupcast. The multiple Tx UEs (e.g., Tx UE1 and Tx UE2) may be associated with multiple source IDs. A first group of sidelink DRX timers (e.g., HARQ_RTT1 timer and HARQ_RxTx1 timer) may be operated for the Tx UE1, and a second group of sidelink DRX timers (e.g., HARQ_RTT1 timer and HARQ_RxTx1 timer) may be operated for the Tx UE2.

In some aspects, a sidelink DRX may be configured per a Layer 2 destination ID for a groupcast, and multiple source IDs (e.g., Tx UE1 and Tx UE2) may be associated with a destination ID (e.g., a group). In this case, sidelink DRX timers may be operated per each source ID (e.g., per each Tx UE).

In some aspects, an on duration (e.g., OnDuration) timer may be activated by UEs participating in the group after entering an on duration of a sidelink DRX cycle.

In some aspects, an inactivity timer may be activated when a reserved retransmission or a new transmission, as indicated in SCI of the first transmission, is outside of an on duration.

As shown by reference number 402, the Tx UE2 may activate an inactivity timer (e.g., Inactivity2) after sending a first transmission (e.g., Init Tx2). The Rx UE may activate the inactivity timer (e.g., Inactivity2) after receiving SCI with the first transmission (e.g., Init Tx2).

In some aspects, when a reserved retransmission or a new transmission, is within the on duration, the inactivity timer may be deactivated.

As shown by reference number 404, the Tx UE1 may set an inactivity timer (e.g., Inactivity1) to zero after sending a first transmission (e.g., Init Tx1). The Rx UE may set the inactivity timer (e.g., Inactivity1) to zero after receiving the first transmission (e.g., Init Tx1).

In some aspects, the inactivity timer may be enabled to support resource reselection, since reserved (re)transmissions within the on duration may be rescheduled outside of the on duration.

In some aspects, the inactivity timer may be enabled to support HARQ retransmissions not reserved or indicated in the SCI (e.g., SCI1) but with HARQ enabled in the SCI (e.g., SCI2), since a HARQ retransmission occasion may be unknown.

In some aspects, the inactivity timer may be enabled to support retransmissions only, e.g., blind retransmissions or repetitions, or HARQ retransmissions. In this case, new packets may not be transmitted after the on timer expires, e.g., in the active duration extended via the inactivity timer. Similarly, the inactivity timer may be reset for running by a Tx UE after transmitting a second SCI with the second transmission with resource reservation for retransmission or a new transmission or without resource reservation but with HARQ enabled. The inactivity timer may be reset for running by a Rx UE after receiving such an SCI with the received second transmission.

In some aspects, an Rx UE may activate a HARQ RTT timer after sending a NACK, or a Tx UE may activate the HARQ RTT timer after receiving a NACK.

As shown by reference number 406, the Rx UE may activate a HARQ_RTT1 timer based at least in part on transmitting a NACK1 to the Tx UE1. The Rx UE may transmit the NACK1 based at least in part on a first transmission (e.g., Init Tx1) not being successfully received from the Tx UE 1.

As shown by reference number 408, the Tx UE1 may activate the HARQ_RTT1 timer 1 after receiving the NACK1 from the Rx UE.

As shown by reference number 410, the Rx UE may activate a HARQ_RTT2 timer based at least in part on transmitting a NACK2 to the Tx UE2. The Rx UE may transmit the NACK2 based at least in part on a first transmission (e.g., Init Tx2) not being successfully received from the Tx UE2.

As shown by reference number 412, the Tx UE2 may activate the HARQ_RTT2 timer after receiving the NACK2 from the Rx UE.

In some aspects, the Rx UE may switch from transmitting to receiving or may stay inactive and may not be able to receive while the HARQ_RTT1 timer or the HARQ_RTT2 timer is running. The Rx UE may not receive from the Tx UE2 while the HARQ_RTT1 timer is running, and the Rx UE may not receive from the Tx UE1 while the HARQ_RTT2 timer is running.

In some aspects, the Tx UE may switch from receiving to transmitting or may stay inactive and may not be able to transmit while the HARQ_RTT timer is running. For example, the Tx UE1 may not be able to send while the HARQ_RTT1 timer is running, and the Tx UE2 may not be able to send while the HARQ_RTT2 timer is running.

In some aspects, since both Tx UE and Rx UE may be inactive for communication while the HARQ_RTT timer is running, no resource reselection may be triggered during this time interval, where the resource reselection may be caused by preemption, a dropped transmission, or collision detection.

In some aspects, a HARQ_RTT timer may be set differently per Rx UE, per a Tx UE capability, and/or per a common value for a plurality of UEs. In some aspects, the inactivity timer may be stopped after the HARQ_RTT timer is activated by a Tx UE or an Rx UE. In some aspects, the inactivity timer may be restarted after another SCI transmitted or received by a Tx UE or an Rx UE for another transmission or retransmission.

In some aspects, a HARQ retransmission timer may be activated based at least in part on an expiry of a HARQ_RTT timer.

As shown by reference number 414, the Rx UE and the Tx UE1 may activate a HARQ ReTx1 timer after the HARQ_RTT1 timer expires.

As shown by reference number 416, the Rx UE and the Tx UE2 may activate a HARQ ReTx2 timer after the HARQ_RTT2 timer expires.

In some aspects, when a HARQ retransmission timer is running, a Tx UE may be triggered to reselect resource for a second transmission reserved by SCI transmitted with a first transmission.

As shown by reference number 418, the Tx UE1 may reselect a resource for a second transmission (e.g., ReTx1). A reselected resource may be before or after an originally reserved resources in time. For example, a transmission occasion of ReTx1 may be altered by the Tx UE1.

As shown by reference number 420, the Tx UE2 may reselect a resource for a second transmission (e.g., ReTx2). A reselected resource may be before or after an originally reserved resources in time. For example, a transmission occasion of ReTx2 may be altered by the Tx UE2.

In some aspects, when the HARQ retransmission timer is running, the Rx UE may continue monitoring scheduling SCI for retransmissions, e.g., ReTx1 from the Tx UE1 or ReTx2 from the Tx UE2, which may be transmitted per an origin reservation or may be transmitted at different times due to resource reselection by the Tx UE1 or the Tx UE2, respectively.

In some aspects, the HARQ retransmission timer may be deactivated by a Tx UE after sending a second transmission. For example, HARQ ReTx1 may be deactivated by the Tx UE1 after sending ReTx1, and HARQ ReTx2 may be deactivated by the Tx UE2 after sending ReTx2.

In some aspects, the HARQ retransmission timer may be deactivated by an Rx after receiving the second transmission. For example, HARQ ReTx1 may be deactivated by the Rx UE after receiving ReTx1, and HARQ ReTx2 may be deactivated by the Rx UE after receiving ReTx2.

As indicated above, FIG. 4 is provided as an example. Other examples may differ from what is described with regard to FIG. 4.

In some aspects, an initial or new transmission (e.g., with a new transport block (TB)) may be transmitted only during an on duration (e.g., when the on timer is running) for a plurality of UEs and only retransmissions may be transmitted in the active state extended by an inactivity timer based at least in part on resources reserved for retransmissions.

In some aspects, an initial or new transmission may be transmitted in the active state extended with an inactivity timer by the same transmitting UE.

In some aspects, an initial or new transmission may be transmitted by a second UE in the active state extended with an inactivity timer by a first UE, e.g., the active time extended by an inactivity timer may be shared among the UEs of the group.

In some aspects, only an initial or new transmission with a priority above a (pre-)configured threshold (e.g., high priority) or with a latency requirement below a (pre-)configured threshold (e.g., low latency) may be transmitted by a second UE in the active state extended with an inactivity timer by a first UE.

In some aspects, an initial or new transmission may be transmitted by a second UE in the active state extended with an inactivity timer by a first UE when a system loading or channel congestion is below a (pre-)configured threshold (e.g., low congested channel).

In some aspects, an initial or new transmission may be transmitted by a second UE in the active state extended with an inactivity timer by a first UE when active time sharing is enabled via a (pre-)configuration for UEs in a group.

In some aspects, a second UE may start an initial or new transmission at the same time as a first UE during an active time while an on timer is running (e.g., during an on duration) or an inactivity timer is running (e.g., extended by the inactivity timer), when both UEs select a same transmission occasion at a same time. In this case, the resources selected in frequency may be the same (e.g., transmission collision) or different (e.g., frequency division multiplexed), and the Rx UE may or may not be able to decode the transmission. In some aspects, a second UE may start an initial or new transmission at the same time while a first UE's HARQ_RTT timer is running and both the first UE and Rx UE(s) are inactive for communications. Therefore, mechanisms to void such transmissions are needed.

In some aspects, for sharing the active time with a first UE, a second UE may monitor the first UE's SCI indicating resource(s) reserved (e.g., via SCI1) and/or priority for the transmission (e.g., via SCI2) either as an Rx UE for packet reception before switching to transmission mode or as a Tx UE for resource sensing and selection, and then may enable its inactivity timer (e.g., synchronized with the first UE's inactivity timer) to share the extended active state with the first UE and may start an initial or new transmission outside an on duration if enabled.

In some aspects, for avoiding transmitting while the first UE's HARQ_RTT timing is running, the second UE may enable its HARQ_RTT timer synchronized with the first UE's timer as an Rx or Tx UE of the group before enabling its transmission. The second UE, as a Tx UE, may exclude the resources before or after HARQ feedback resources (e.g., the resources allocated for physical sidelink feedback control channel (PSFCH)) in the resource pool for resource sensing and selection based on monitoring the first UE's SCI indicating resource selection or reservation.

In some aspects, for avoiding causing performance degradation to a first UE, a second UE may wait until the first UE finishes its transmission and/or retransmission during an active time either with an on timer running (e.g., during an on duration) or with an inactivity timer running (e.g., during an extended active time by the inactivity timer). For example, the second UE may enable its HARQ_RTT timer and then HARQ retransmission timer synchronized with the first UE's timers as an Rx or Tx UE of the group until the end of Tx UE1's transmission or retransmission(s). The second UE, as a Tx UE, may exclude the resources selected or reserved by the first UE for transmission and/or retransmission(s) in the resource pool based on monitoring the first UE's resource selection and reservation. In some aspects, the second UE may determine to wait or not based on QoS requirements, such as latency, reliability, and/or priority. For example, if the second UE's packet transmission priority is above a threshold or higher than the first UE's packet transmission or retransmission as indicated in the first UE's SCI2, the second UE may select resources for a transmission before the first UE finishes its transmission and retransmission(s). In some aspects, the second UE may determine to wait or not based on system loading or channel congestion. For example, if a channel busy ratio (CBR) measurement is below a threshold, the second UE may select resources for a transmission before the first UE finishes its transmission and retransmission(s). In some aspects, the second UE may determine to wait or not based on any combination of the criteria described.

Without losing the general implementation, the above described aspects related to the inactivity timer are generally applicable to a broadcast scenario.

Figure 5:
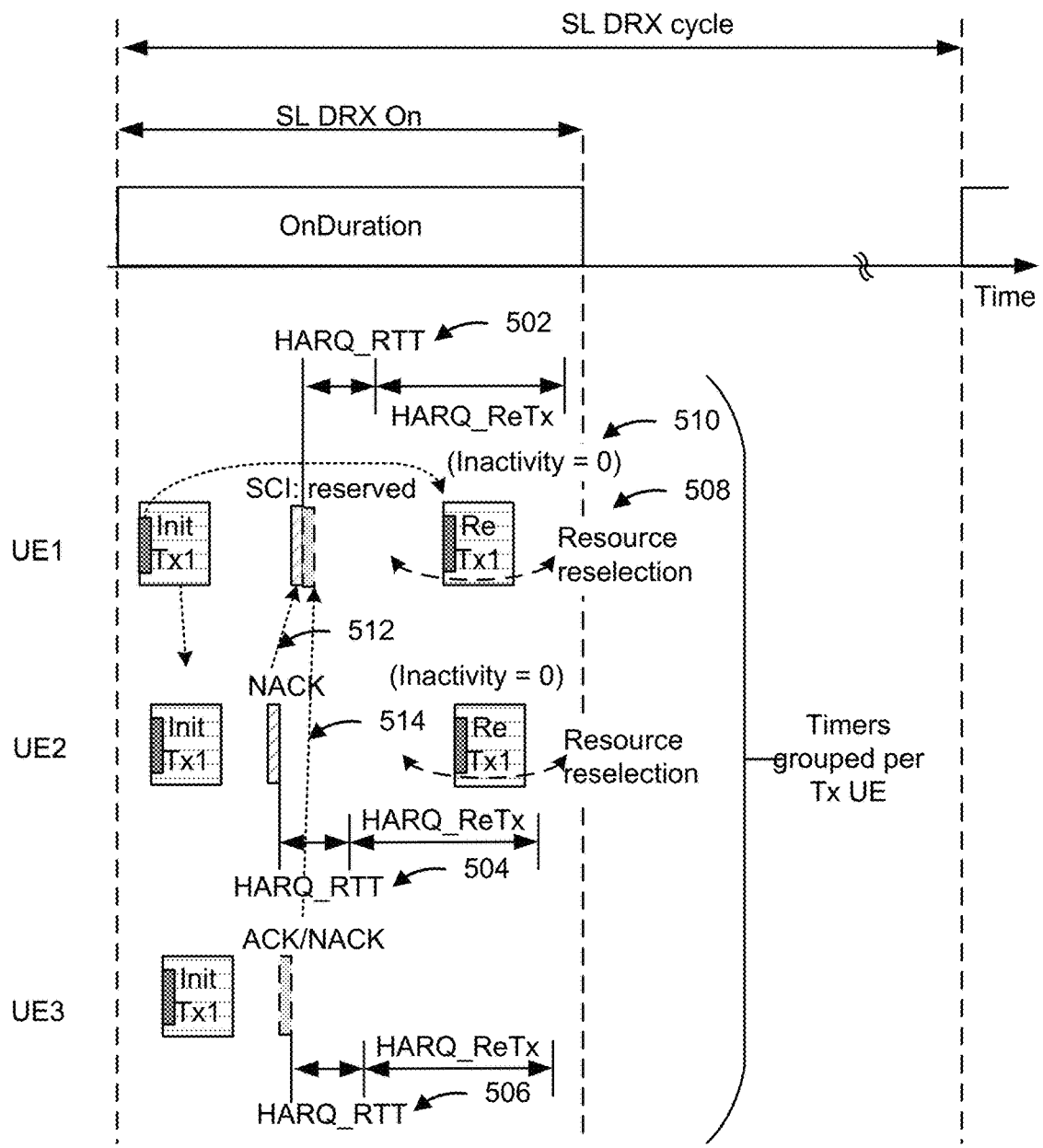

FIG. 5 is a diagram illustrating an example 500 associated with sidelink DRX timer operations, in accordance with the present disclosure.

As shown in FIG. 5, a sidelink DRX cycle may include a sidelink DRX on duration. Multiple UEs may perform Tx and Rx operations within the on duration. For example, a UE1 may transmit a first transmission (e.g., Init Tx1) to a UE2 and a UE3. The UE2 may not receive the first transmission from the UE1, so the UE2 may transmit a NACK to the UE1. The UE3 may receive the first transmission from the UE1, so the UE3 may transmit an ACK to the UE1 for ACK and NACK based HARQ retransmission, or the UE3 may not send ACK to the UE1 for a NACK-only based HARQ retransmission.

In some aspects, a sidelink DRX may be configured per a Layer 2 destination ID for a groupcast, and multiple Rx UEs may participate in the group (e.g., same destination ID). In this case, sidelink DRX timers may be operated the same or differently by different Rx UEs for a Tx UE.

In some aspects, a HARQ_RTT timer may be deactivated based at least in part on a transmission or a reception of an ACK for ACK/NACK based retransmission, or based at least in part on no transmission or a reception of a NACK for NACK only based retransmission. In this case, the reserved retransmission(s) may be avoided.

In some aspects, a HARQ_RTT timer may be activated based at least in part on a transmission or a reception of an ACK or NACK by a UE.

As shown by reference number 502, the UE1 may activate the HARQ_RTT timer after receiving a NACK from the UE2 (as shown by reference number 512). In other words, the HARQ_RTT timer may be activated by the UE1 after receiving the first NACK.

As shown by reference number 504, the UE2 may activate the HARQ_RTT timer after transmitting a NACK to the UE1 (as shown by reference number 512). In other words, the HARQ_RTT timer may be activated by the UE2 after transmitting the NACK to the UE1.

As shown by reference number 506, the UE3 may activate the HARQ_RTT timer after transmitting a NACK (as shown by reference number 514) to the UE1. In other words, the HARQ_RTT timer may be activated by the UE3 after transmitting the NACK to the UE1.

Alternatively, the HARQ_RTT timer may be activated by the UE3 after transmitting an ACK (as shown by reference number 514) to the UE1 for ACK/NACK based HARQ retransmission or the HARQ_RTT timer may be activated by the UE3 after its HARQ feedback occasion without sending ACK to the UE1 for NACK only based HARQ retransmission. In this case, the UE3 may be in sync with the UE1 and the UE2, which may prevent the UE3 from sending a transmission such that the UE1 and/or UE2 may not miss a transmission from the UE3 while the HARQ_RTT timer is running. The UE3 may switch to transmitting during this time when a packet is available to send. The UE3 may send the packet after the HARQ_RTT timer expires so that the UE1 and/or the UE2 may detect and receive the transmission from the UE3 accordingly. In another example, the HARQ_RTT timer may be activated by the UE3 after transmitting an ACK (as shown by reference number 514) to the UE1 for ACK/NACK based HARQ retransmission, or the HARQ_RTT timer may be activated by the UE3 after its HARQ feedback occasion without sending ACK to the UE1 for NACK only based HARQ retransmission and the UE1 may not activate the HARQ_RTT timer when the UE1 received an ACK or received no NACK from other UEs. In this case, the UE3 may end its monitoring to the UE1's retransmission when its HARQ retransmission timer ends, e.g., no retransmission from the UE1 since all UEs successfully decoded the initial transmission.

In some aspects, the HARQ_RTT timer may be deactivated by the UE3 after successful decoding of UE1's transmission (i.e. after sending a ACK or not sending an ACK to the UE1). The UE3 may stay active as an Rx UE for monitoring a transmission from other UEs or as a Tx UE for monitoring SCIs from other UEs for resource sensing and selection during the active time while the on timer is running (e.g., before an expiry of the on duration timer) or the inactivity timer is running (e.g., after an expiry of the on duration timer).

In some aspects, the HARQ_RTT timer may be deactivated by the UE3 after successful decoding of UE1's transmission (e.g., sending an ACK or not sending an ACK to the UE1). The UE3 may end its active state when the UE3 does not expect to detect or receive an initial or new transmission from other UEs or if the UE3 does not have a packet for transmission while the on duration timer is running (e.g., before an expiry of the on duration timer) or the inactivity timer is running (e.g., after an expiry of the on duration timer).

In some aspects, a HARQ retransmission timer may be activated based at least in part on an expiry of a HARQ_RTT timer and at least one NACK is transmitted or received. In some aspects, when the HARQ retransmission timer is running, a UE may be triggered to reselect resource for a second transmission reserved by SCI transmitted with a first transmission.

As shown by reference number 508, the UE1 may reselect a resource for a second transmission (e.g., ReTx1). A reselected resource may be before or after an originally reserved resources in time.

In some aspects, when a reserved retransmission or a new transmission is within the on duration an inactivity timer may be deactivated if resource reselection is disabled and an original reserved retransmission is within the on duration.

As shown by reference number 510, the UE1 may set an inactivity timer (e.g., Inactivity) to zero after sending a first transmission (e.g., Init Tx1) when resource reselection is disabled by a (pre-)configuration. The UE2 may set the inactivity timer (e.g., Inactivity) to zero after transmitting the NACK to the UE1 when resource reselection is disabled by a (pre-)configuration.

As indicated above, FIG. 5 is provided as an example. Other examples may differ from what is described with regard to FIG. 5.

Figure 6:
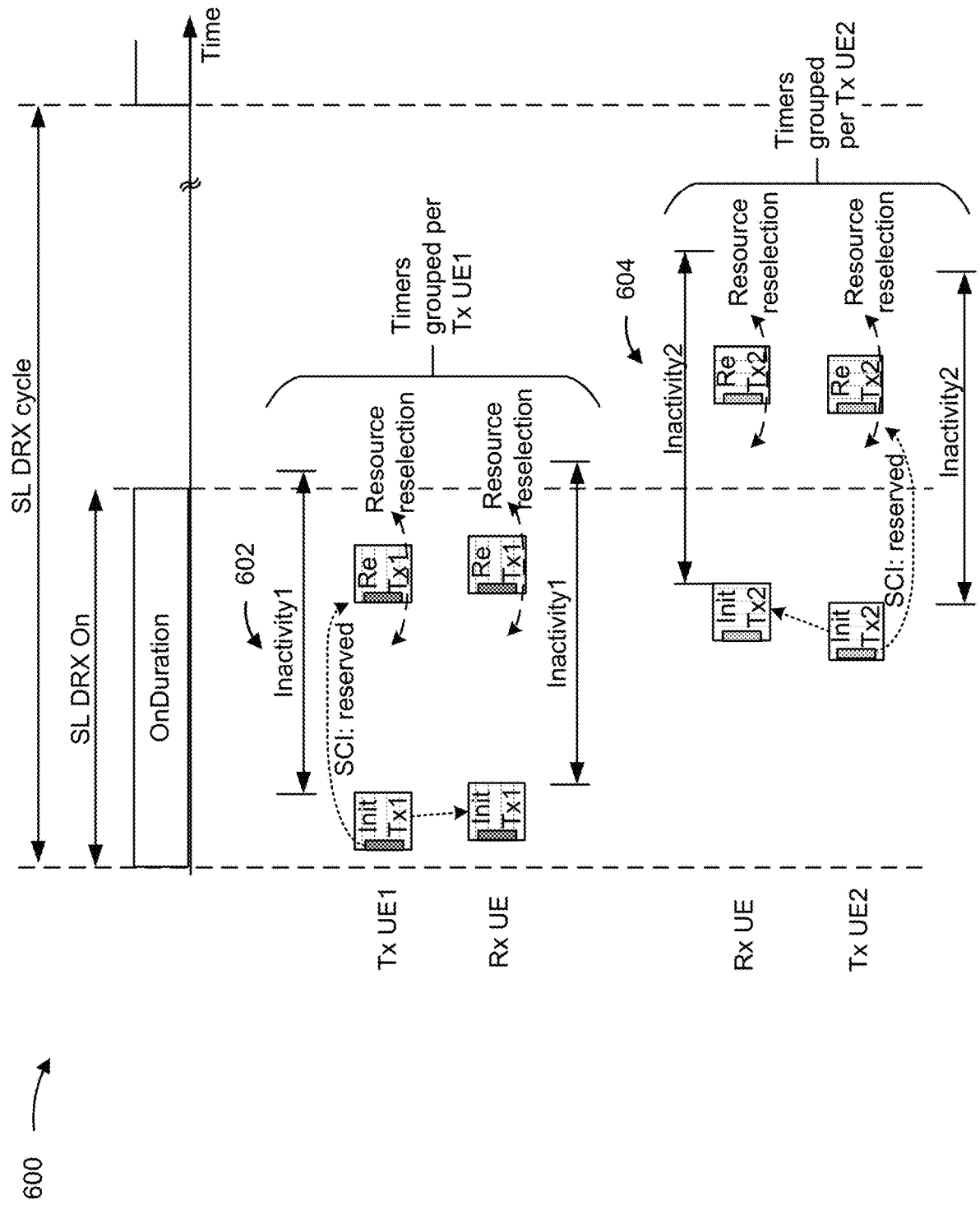

FIG. 6 is a diagram illustrating an example 600 associated with sidelink DRX timer operations, in accordance with the present disclosure.

As shown in FIG. 6, a sidelink DRX cycle may include a sidelink DRX on duration. Multiple Tx UEs (e.g., Tx UE1 and Tx UE2) may transmit to a same Rx UE. The multiple Tx UEs (e.g., Tx UE1 and Tx UE2) may be associated with multiple source IDs. A first group of sidelink DRX timers may be operated for the Tx UE1, and a second group of sidelink DRX timers may be operated for the Tx UE2.

In some aspects, a sidelink DRX may be configured per a Layer 2 destination ID for a broadcast service, and multiple source IDs (e.g., Tx UE1 and Tx UE2) may be associated with a destination ID (e.g., a group). In this case, sidelink DRX timers may be operated per each source ID (e.g., per each Tx UE).

In some aspects, an on duration timer may be activated by a plurality of UEs participating in the broadcast after entering an on duration of a sidelink DRX cycle.

In some aspects, an inactivity timer may be activated when a reserved blind retransmission (e.g., repetition(s) of a TB transmission without HARQ feedback) or a new transmission is out of the on duration, or when a resource selection is enabled, which may reschedule the (re-)transmission out of the on duration.

As shown by reference number 602, an inactivity timer (e.g., Inactivity1) may be activated based at least in part on a resource reselection being enabled (e.g., ReTx1 reserved by Tx UE1).

As shown by reference number 604, an inactivity timer (e.g., Inactivity2) may be activated based at least in part on a reserved retransmission or a new transmission being out of the on duration (e.g., ReTx2 reserved by Tx UE2).

In some aspects, the inactivity timer may be activated by a Tx UE after sending a first transmission that reserves a second transmission. In some aspects, the inactivity timer may be activated by an Rx UE after receiving the first transmission that reserves the second transmission.

In some aspects, the inactivity timer may be deactivated (e.g., set to zero) based at least in part on a reserved transmission or new transmission being within the on duration, a resource reselection being disabled, and/or no reservation for a second transmission. For example, the Tx UE1 may deactivate the inactivity timer after sending a first transmission, and the inactivity timer may be deactivated by the Rx UE after receiving the first transmission.

As indicated above, FIG. 6 is provided as an example. Other examples may differ from what is described with regard to FIG. 6.

Figure 7:
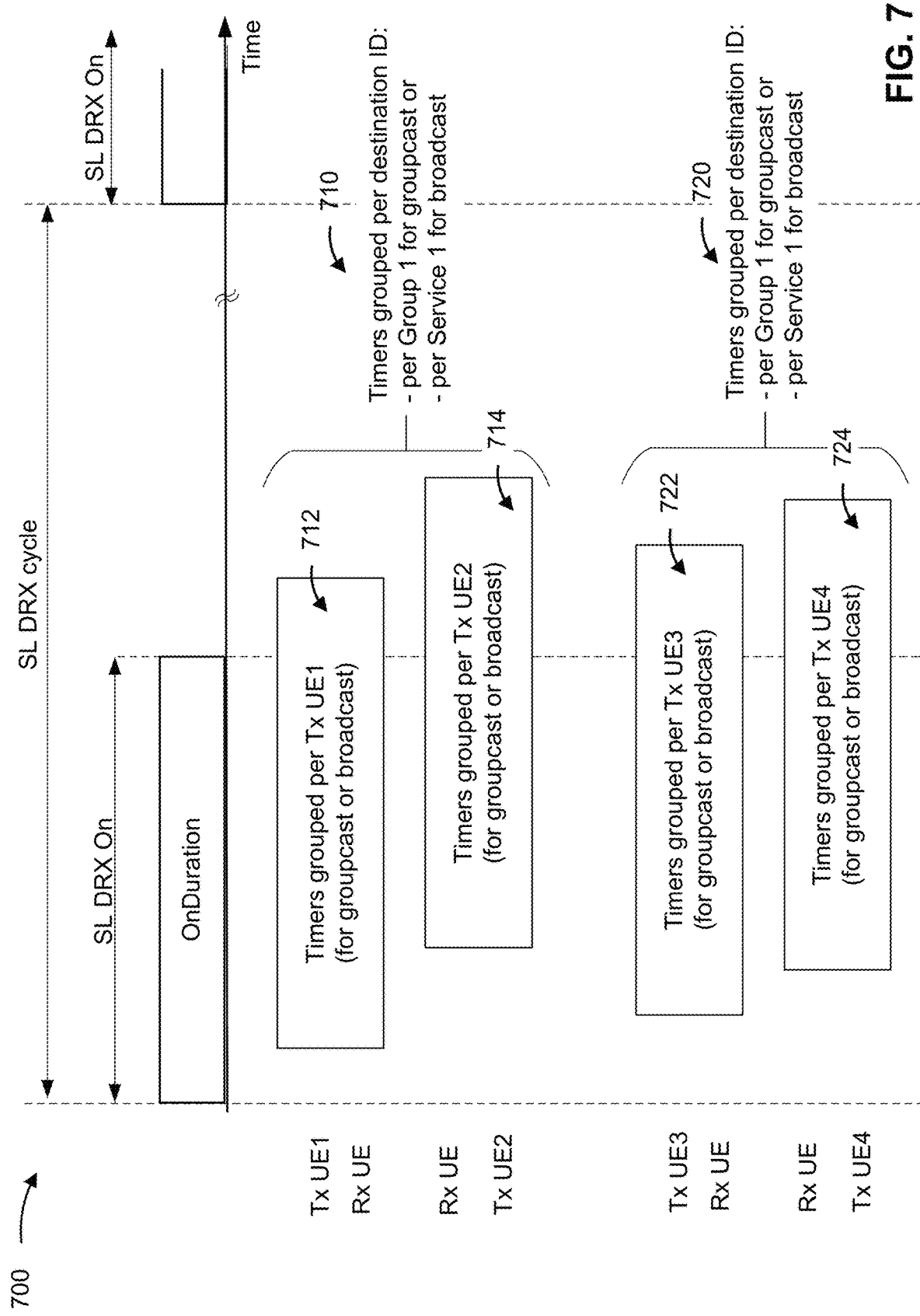

FIG. 7 is a diagram illustrating an example 700 associated with sidelink DRX timer operations, in accordance with the present disclosure.

In some aspects, a UE may participate in multiple groups or services with a same QoS profile or PQI. The UE may be configured with a same sidelink DRX corresponding the QoS profile or PQI for the multiple groups or services. In this case, sidelink DRX timers may be associated to different grants for different groups or services, or the sidelink DRX timers may be associated with multiple pairs of source IDs (e.g., Tx UEs) and destination IDs (e.g., groups or services).

A sidelink DRX cycle per a QoS profile or PQI may include a sidelink DRX on duration and a sidelink DRX cycle length, as well as an offset (not shown in the figure) for a start of the on duration. A sidelink DRX configured per a QoS profile or PQI for multiple groupcasts or broadcasts, e.g., multiple destination IDs, may contain at least one timer for the on duration, at least one inactivity timer for extending an active state of the on duration, and/or at least one pair of timers for HARQ feedback based retransmission (e.g., a HARQ_RTT timer and a HARQ retransmission timer) if enabled for groupcasts.

The one or multiple on duration timers and one or multiple inactivity timers may each be set with a value for a group or a service (e.g., for a destination ID) respectively, so that a plurality of UEs of a groupcast or a broadcast (e.g., associated to a destination ID) may be synchronized with the same active state setting for the QoS profile or PQI based sidelink DRX cycle. Alternatively, the one or multiple on duration timers and the one or multiple inactivity timers may be set with a common value respectively (e.g., a common on duration timer value and a common inactivity timer value) for a plurality of UEs of groupcasts or broadcasts sharing the same QoS profile or PQI based sidelink DRX cycle, such that the UEs of groupcasts or broadcasts (e.g., associated to different destination IDs) may be synchronized with the same active state setting based at least in part on the PQI.

The HARQ_RTT timer may be configured per each UE's capability or configured with a common value for a plurality of UEs of a group to synchronize HARQ_RTT operation among the UEs of a group. Alternatively, the HARQ_RTT timer may be configured with a common value for the UEs sharing the PQI based sidelink DRX to synchronize HARQ_RTT operation among the UEs.

The HARQ retransmission timer may be configured with one or multiple values for different groupcasts. Alternatively, the HARQ retransmission timer may be configured with a common value for a plurality of groupcasts sharing the PQI based sidelink DRX based at least in part on QoS requirements associated to the PQI.

Multiple Tx UEs (e.g., Tx UE1, Tx UE2, Tx UE3, and Tx UE4) may transmit to a same Rx UE. Sidelink DRX timers may be assembled per each group for groupcast, or per each service for broadcast (e.g., per each destination ID). Within each group (e.g., for each destination ID), the sidelink DRX timers may be operated per each Tx UE (e.g., for each source ID), for groupcast and for broadcast. The sidelink DRX timers may include an on duration timer, an inactivity timer, a HARQ_RTT timer, and/or a HARQ retransmission timer if HARQ retransmission is enabled for groupcasts.

In some aspects, for sidelink DRX timer operations with a QoS profile or PQI-based sidelink DRX with multiple groups for groupcast or multiple services for broadcast, the sidelink DRX timers may be assembled per each destination ID (e.g., per group or per group), and the sidelink DRX timers may be operated per each Tx UE within each assemblage.

As shown in FIG. 7, and as shown by reference number 710, a first group of sidelink DRX timers may be grouped per destination ID (e.g., per a first group for groupcast or per a first service for broadcast). As shown by reference number 712, within the first group of sidelink DRX timers, a first set of sidelink DRX timers may be grouped per Tx UE1 for groupcast or for broadcast. As shown by reference number 714, within the first group of sidelink DRX timers, a second set of sidelink DRX timers may be grouped per Tx UE2 for groupcast or for broadcast. As shown by reference number 720, a second group of sidelink DRX timers may be grouped per destination ID (e.g., per a first group for groupcast or per a first service for broadcast). As shown by reference number 722, within the second group of sidelink DRX timers, a first set of sidelink DRX timers may be grouped per Tx UE3 for groupcast or for broadcast. As shown by reference number 724, within the second group of sidelink DRX timers, a second set of sidelink DRX timers may be grouped per Tx UE4 for groupcast or for broadcast.

As indicated above, FIG. 7 is provided as an example. Other examples may differ from what is described with regard to FIG. 7.

Figure 8:
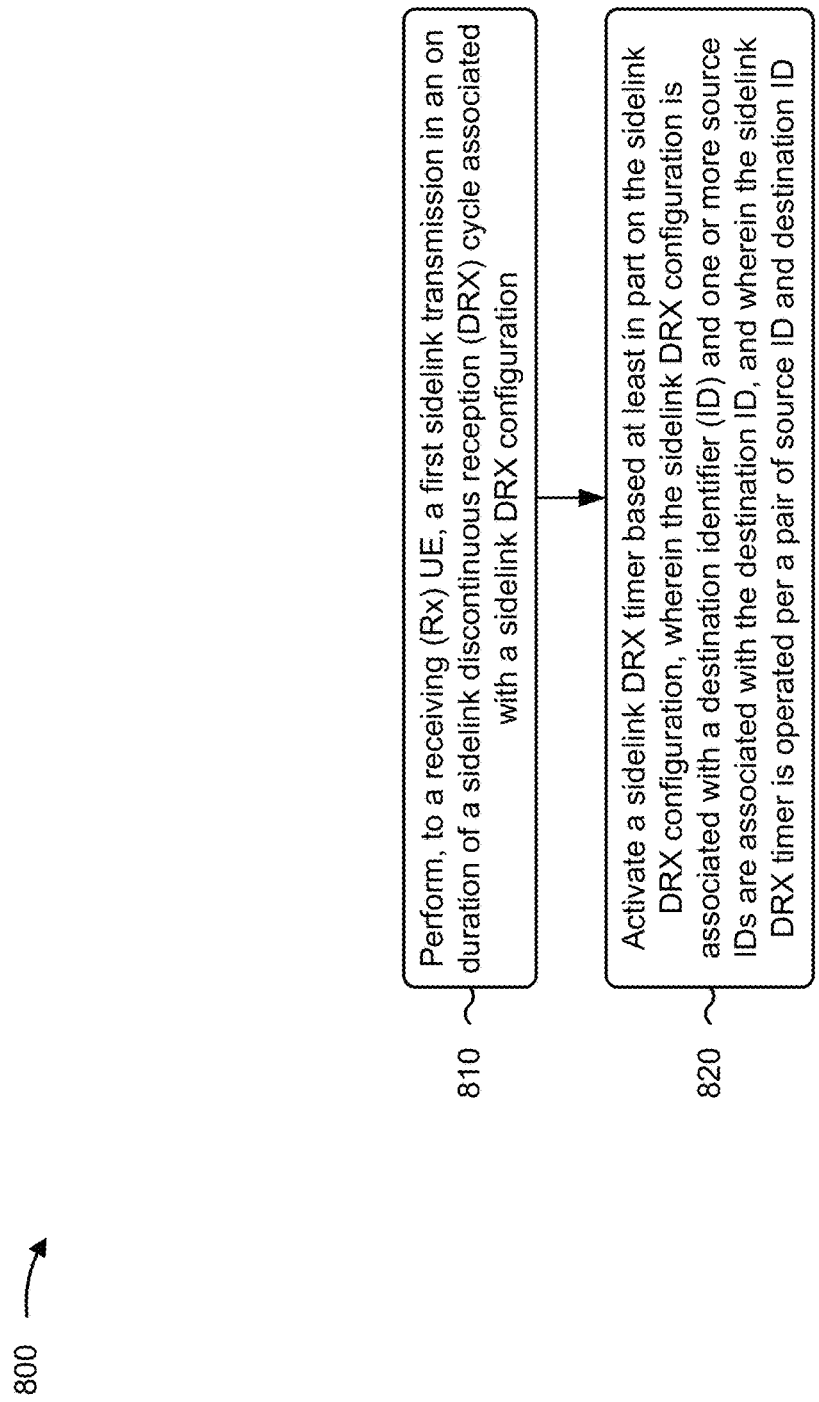
FIGS. 8-10 are diagrams illustrating example processes associated with sidelink DRX timer operations, in accordance with the present disclosure.

FIG. 8 is a diagram illustrating an example process 800 performed, for example, by a Tx UE, in accordance with the present disclosure. Example process 800 is an example where the Tx UE (e.g., UE 120a) performs operations associated with sidelink DRX timer operations.

As shown in FIG. 8, in some aspects, process 800 may include performing, to an Rx UE, a first sidelink transmission in an on duration of a sidelink DRX cycle associated with a sidelink DRX configuration (block 810). For example, the Tx UE (e.g., using transmission component 1104, depicted in FIG. 11) may perform, to an Rx UE, a first sidelink transmission in an on duration of a sidelink DRX cycle associated with a sidelink DRX configuration, as described above.

As further shown in FIG. 8, in some aspects, process 800 may include activating a sidelink DRX timer based at least in part on the sidelink DRX configuration, wherein the sidelink DRX configuration is associated with a destination ID and one or more source IDs are associated with the destination ID, and wherein the sidelink DRX timer is operated per a pair of source ID and destination ID (block 820). For example, the Tx UE (e.g., using activation component 1108, depicted in FIG. 11) may activate a sidelink DRX timer based at least in part on the sidelink DRX configuration, wherein the sidelink DRX configuration is associated with a destination ID and one or more source IDs are associated with the destination ID, and wherein the sidelink DRX timer is operated per a pair of source ID and destination ID, as described above.

Process 800 may include additional aspects, such as any single aspect or any combination of aspects described below and/or in connection with one or more other processes described elsewhere herein.

In a first aspect, the destination ID is a layer 2 destination ID for a groupcast.

In a second aspect, alone or in combination with the first aspect, the source ID in the one or more source IDs is associated with the Tx UE, and the one or more source IDs corresponds to one or more Tx UEs.

In a third aspect, alone or in combination with one or more of the first and second aspects, activating the sidelink DRX timer comprises activating an on duration timer based at least in part on entering the on duration of the sidelink DRX cycle.

In a fourth aspect, alone or in combination with one or more of the first through third aspects, activating the sidelink DRX timer comprises activating an inactivity timer based at least in part on a SCI of the first sidelink transmission.

In a fifth aspect, alone or in combination with one or more of the first through fourth aspects, the inactivity timer is deactivated based at least in part on the reserved sidelink transmission or the new sidelink transmission, as indicated in the SCI of the first sidelink transmission, is within the on duration of the sidelink DRX cycle.

In a sixth aspect, alone or in combination with one or more of the first through fifth aspects, process 800 includes receiving, from the Rx UE, a NACK based at least in part on the first sidelink transmission, and wherein activating the sidelink DRX timer comprises activating a HARQ_RTT timer based at least in part on the NACK.

In a seventh aspect, alone or in combination with one or more of the first through sixth aspects, process 800 includes switching to an inactive state for sidelink communications while the HARQ_RTT timer is running.

In an eighth aspect, alone or in combination with one or more of the first through seventh aspects, reselection is not triggered based at least in part on a preemption, a dropped transmission, or a collision while the HARQ_RTT timer is running.

In a ninth aspect, alone or in combination with one or more of the first through eighth aspects, a value associated with the HARQ_RTT timer is based at least in part on a common value for a plurality of UEs.

In a tenth aspect, alone or in combination with one or more of the first through ninth aspects, activating the HARQ_RTT timer comprises activating the HARQ_RTT timer based at least in part on stopping an inactivity timer.

In an eleventh aspect, alone or in combination with one or more of the first through tenth aspects, activating the sidelink DRX timer comprises activating a HARQ retransmission timer based at least in part on an expiry of a HARQ_RTT timer.

In a twelfth aspect, alone or in combination with one or more of the first through eleventh aspects, process 800 includes determining, while the HARQ retransmission timer is running, a reselected resource for a second sidelink transmission reserved by SCI transmitted with the first sidelink transmission, wherein the reselected resource is before or after in time an originally reserved resource associated with the SCI.

In a thirteenth aspect, alone or in combination with one or more of the first through twelfth aspects, process 800 includes performing, to the Rx UE, the second sidelink transmission, wherein the HARQ retransmission timer is deactivated after the second sidelink transmission is performed.

In a fourteenth aspect, alone or in combination with one or more of the first through thirteenth aspects, the Rx UE is one of multiple Rx UEs associated with the destination ID.

In a fifteenth aspect, alone or in combination with one or more of the first through fourteenth aspects, the destination ID is a layer 2 destination ID for a broadcast service.

In a sixteenth aspect, alone or in combination with one or more of the first through fifteenth aspects, activating the sidelink DRX timer comprises activating an inactivity timer after performing the first sidelink transmission that reserves a second sidelink transmission.

In a seventeenth aspect, alone or in combination with one or more of the first through sixteenth aspects, activating the sidelink DRX timer comprises activating an inactivity timer based at least in part on a resource reselection for a retransmission or a new transmission being enabled.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
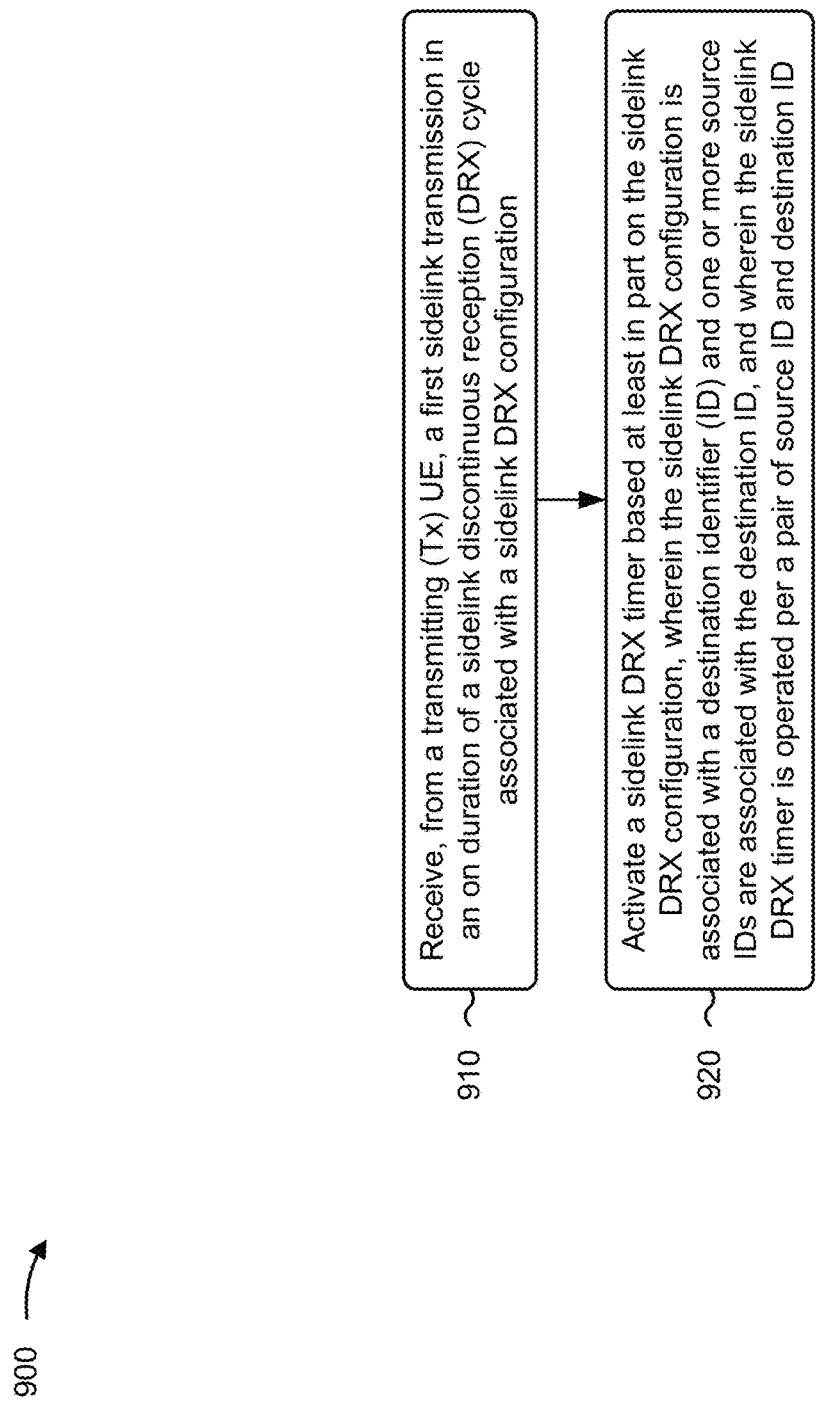

FIG. 9 is a diagram illustrating an example process 900 performed, for example, by an Rx UE, in accordance with the present disclosure. Example process 900 is an example where the Rx UE (e.g., UE 120e) performs operations associated with sidelink DRX timer operations.

As shown in FIG. 9, in some aspects, process 900 may include receiving, from a Tx UE, a first sidelink transmission in an on duration of a sidelink DRX cycle associated with a sidelink DRX configuration (block 910). For example, the Rx UE (e.g., using reception component 1102, depicted in FIG. 11) may receive, from a Tx UE, a first sidelink transmission in an on duration of a sidelink DRX cycle associated with a sidelink DRX configuration, as described above.

As further shown in FIG. 9, in some aspects, process 900 may include activating a sidelink DRX timer based at least in part on the sidelink DRX configuration, wherein the sidelink DRX configuration is associated with a destination ID and one or more source IDs are associated with the destination ID, and wherein the sidelink DRX timer is operated per a pair of source ID and destination ID (block 920). For example, the Rx UE (e.g., using activation component 1108, depicted in FIG. 11) may activate a sidelink DRX timer based at least in part on the sidelink DRX configuration, wherein the sidelink DRX configuration is associated with a destination ID and one or more source IDs are associated with the destination ID, and wherein the sidelink DRX timer is operated per a pair of source ID and destination ID, as described above.

Process 900 may include additional aspects, such as any single aspect or any combination of aspects described below and/or in connection with one or more other processes described elsewhere herein.

In a first aspect, the destination ID is a layer 2 destination ID for a groupcast.

In a second aspect, alone or in combination with the first aspect, the source ID in the one or more source IDs is associated with the Tx UE, and the one or more source IDs corresponds to one or more Tx UEs.

In a third aspect, alone or in combination with one or more of the first and second aspects, activating the sidelink DRX timer comprises activating an on duration timer based at least in part on entering the on duration of the sidelink DRX cycle.

In a fourth aspect, alone or in combination with one or more of the first through third aspects, activating the sidelink DRX timer comprises activating an inactivity timer based at least in part on a SCI of the first sidelink transmission.

In a fifth aspect, alone or in combination with one or more of the first through fourth aspects, process 900 includes transmitting, to the Tx UE, a NACK based at least in part on the first sidelink transmission, and wherein activating the sidelink DRX timer comprises activating a HARQ_RTT timer based at least in part on the NACK.

In a sixth aspect, alone or in combination with one or more of the first through fifth aspects, process 900 includes switching to an inactive state for sidelink communications while the HARQ_RTT timer is running.

In a seventh aspect, alone or in combination with one or more of the first through sixth aspects, a value associated with the HARQ_RTT timer is based at least in part on a common value for a plurality of UEs.

In an eighth aspect, alone or in combination with one or more of the first through seventh aspects, activating the HARQ_RTT timer comprises activating the HARQ_RTT timer based at least in part on stopping an inactivity timer.

In a ninth aspect, alone or in combination with one or more of the first through eighth aspects, activating the sidelink DRX timer comprises activating a HARQ retransmission timer based at least in part on an expiry of a HARQ_RTT timer.

In a tenth aspect, alone or in combination with one or more of the first through ninth aspects, process 900 includes monitoring, while the HARQ retransmission timer is running, for a scheduling sidelink control information for a second sidelink transmission.

In an eleventh aspect, alone or in combination with one or more of the first through tenth aspects, process 900 includes deactivating the HARQ retransmission timer after receiving the second sidelink transmission from the Tx UE.

In a twelfth aspect, alone or in combination with one or more of the first through eleventh aspects, the Rx UE is one of multiple Rx UEs associated with the destination ID.

In a thirteenth aspect, alone or in combination with one or more of the first through twelfth aspects, process 900 includes transmitting, to the Tx UE, an ACK based at least in part on the first sidelink transmission, and wherein activating the sidelink DRX timer comprises activating a HARQ_RTT timer based at least in part on the ACK.

In a fourteenth aspect, alone or in combination with one or more of the first through thirteenth aspects, the HARQ_RTT timer is deactivated based at least in part on the ACK.

In a fifteenth aspect, alone or in combination with one or more of the first through fourteenth aspects, the destination ID is a layer 2 destination ID for a broadcast service.

In a sixteenth aspect, alone or in combination with one or more of the first through fifteenth aspects, activating the sidelink DRX timer comprises activating an inactivity timer after receiving, from the Tx UE, the first sidelink transmission that reserves a second sidelink transmission.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
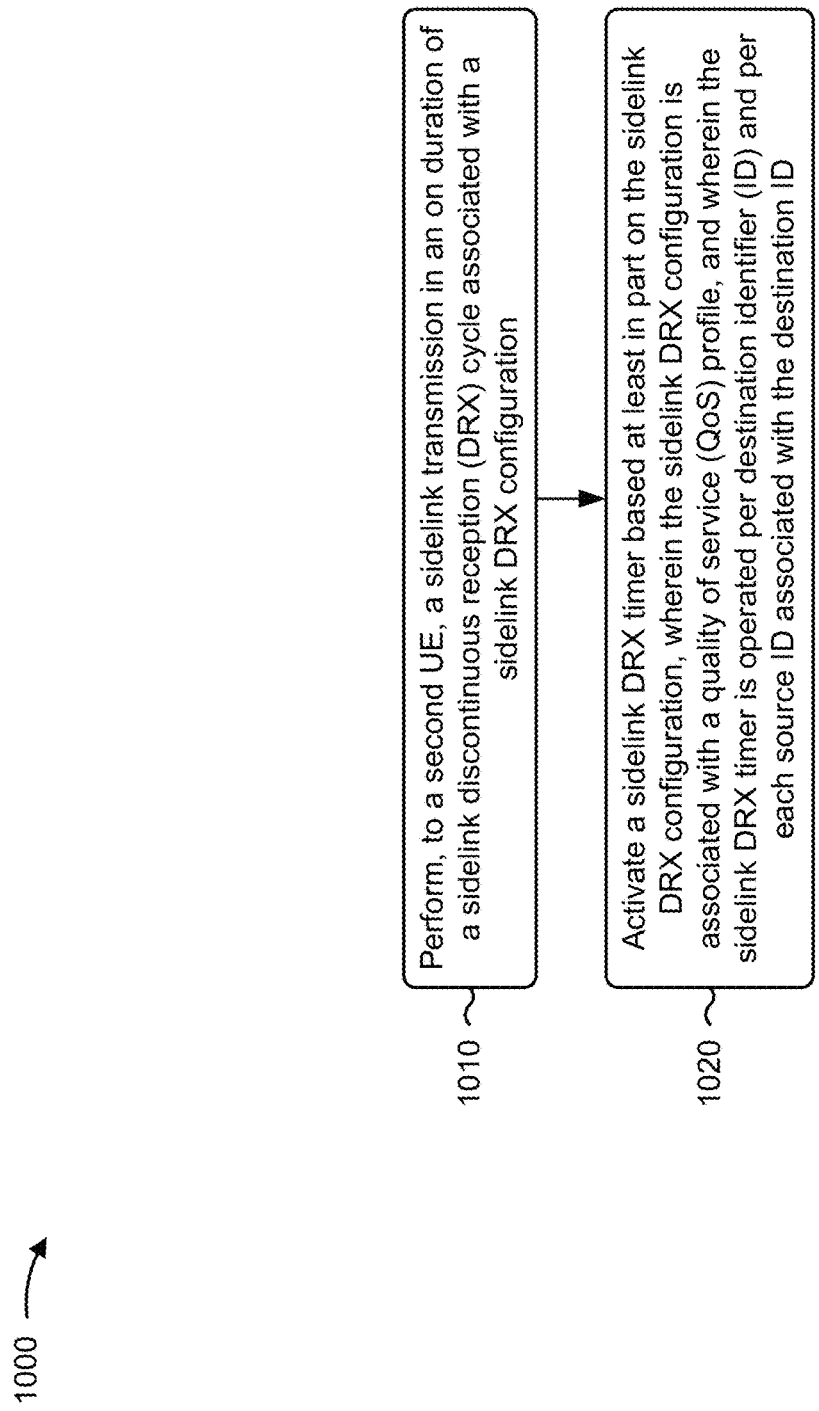

FIG. 10 is a diagram illustrating an example process 1000 performed, for example, by a first UE, in accordance with the present disclosure. Example process 1000 is an example where the first UE (e.g., UE 120a or UE 120e) performs operations associated with sidelink DRX timer operations.

As shown in FIG. 10, in some aspects, process 1000 may include performing, to a second UE, a sidelink transmission in an on duration of a sidelink DRX cycle associated with a sidelink DRX configuration (block 1010). For example, the first UE (e.g., using transmission component 1104, depicted in FIG. 11) may perform, to a second UE, a sidelink transmission in an on duration of a sidelink DRX cycle associated with a sidelink DRX configuration, as described above.

As further shown in FIG. 10, in some aspects, process 1000 may include activating a sidelink DRX timer based at least in part on the sidelink DRX configuration, wherein the sidelink DRX configuration is associated with a QoS profile, and wherein the sidelink DRX timer is operated per destination ID and per each source ID associated with the destination ID (block 1020). For example, the first UE (e.g., using activation component 1108, depicted in FIG. 11) may activate a sidelink DRX timer based at least in part on the sidelink DRX configuration, wherein the sidelink DRX configuration is associated with a QoS profile, and wherein the sidelink DRX timer is operated per destination ID and per each source ID associated with the destination ID, as described above.

Process 1000 may include additional aspects, such as any single aspect or any combination of aspects described below and/or in connection with one or more other processes described elsewhere herein.

In a first aspect, the destination ID is associated with a group for groupcast or a service for broadcast.

In a second aspect, alone or in combination with the first aspect, the source ID is associated with a transmitting UE.

In a third aspect, alone or in combination with one or more of the first and second aspects, the first UE is a transmitting UE and the second UE is a receiving UE.

In a fourth aspect, alone or in combination with one or more of the first through third aspects, the first UE is a receiving UE and the second UE is a transmitting UE at different time occasions in the on duration of the sidelink DRX cycle.

In a fifth aspect, alone or in combination with one or more of the first through fourth aspects, the sidelink DRX timer is one of an inactivity timer, a HARQ_RTT timer, or a HARQ retransmission timer.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
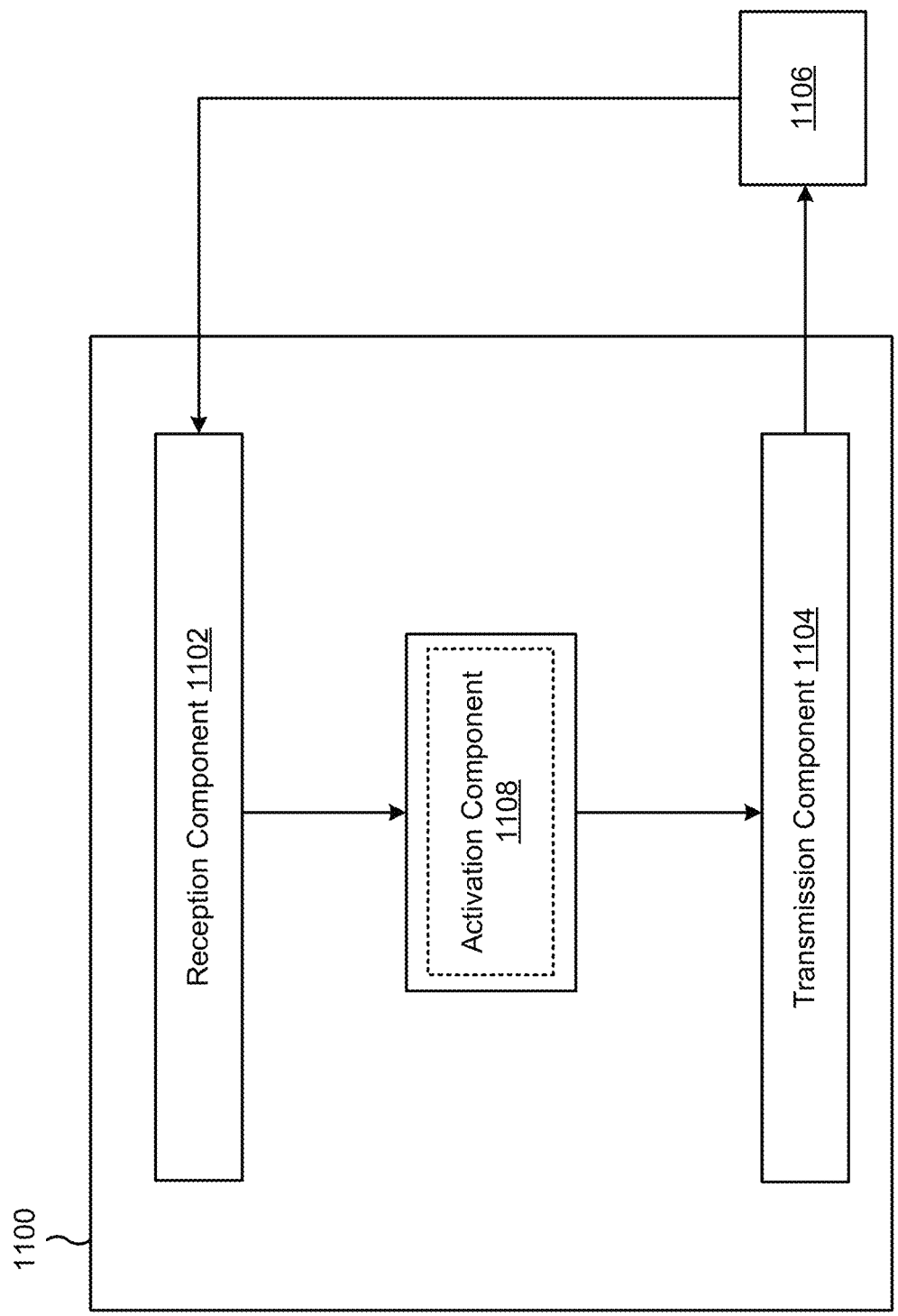
FIG. 11 is a block diagram of an example apparatus for wireless communication, in accordance with the present disclosure.

FIG. 11 is a block diagram of an example apparatus 1100 for wireless communication. The apparatus 1100 may be a UE (e.g., a Tx UE, an Rx UE, or a first UE), or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include an activation component 1108, among other examples.

In some aspects, the apparatus 1100 may be configured to perform one or more operations described herein in connection with FIGS. 3-7. Additionally, or alternatively, the apparatus 1100 may be configured to perform one or more processes described herein, such as process 800 of FIG. 8, process 900 of FIG. 9, process 1000 of FIG. 10, or a combination thereof. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

The transmission component 1104 may perform, to an Rx UE, a first sidelink transmission in an on duration of a sidelink DRX cycle associated with a sidelink DRX configuration. The activation component 1108 may activate a sidelink DRX timer based at least in part on the sidelink DRX configuration, wherein the sidelink DRX configuration is associated with a destination ID and one or more source IDs are associated with the destination ID, and wherein the sidelink DRX timer is operated per a pair of source ID and destination ID.

The reception component 1102 may receive, from a Tx UE, a first sidelink transmission in an on duration of a sidelink DRX cycle associated with a sidelink DRX configuration. The activation component 1108 may activate a sidelink DRX timer based at least in part on the sidelink DRX configuration, wherein the sidelink DRX configuration is associated with a destination ID and one or more source IDs are associated with the destination ID, and wherein the sidelink DRX timer is operated per a pair of source ID and destination ID.

The transmission component 1104 may perform, to a second UE, a sidelink transmission in an on duration of a sidelink DRX cycle associated with a sidelink DRX configuration. The activation component 1108 may activate a sidelink DRX timer based at least in part on the sidelink DRX configuration, wherein the sidelink DRX configuration is associated with a QoS, and wherein the sidelink DRX timer is operated per destination ID and per each source ID associated with the destination ID.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a transmitting (Tx) user equipment (UE), comprising: performing, to a receiving (Rx) UE, a first sidelink transmission in an on duration of a sidelink discontinuous reception (DRX) cycle associated with a sidelink DRX configuration; and activating a sidelink DRX timer based at least in part on the sidelink DRX configuration, wherein the sidelink DRX configuration is associated with a destination identifier (ID) and one or more source IDs are associated with the destination ID, and wherein the sidelink DRX timer is operated per a pair of source ID and destination ID.

Aspect 2: The method of Aspect 1, wherein the destination ID is a layer 2 destination ID for a groupcast.

Aspect 3: The method of any of Aspects 1 through 2, wherein the source ID in the one or more source IDs is associated with the Tx UE, and the one or more source IDs corresponds to one or more Tx UEs.

Aspect 4: The method of any of Aspects 1 through 3, wherein activating the sidelink DRX timer comprises activating an on duration timer based at least in part on entering the on duration of the sidelink DRX cycle.

Aspect 5: The method of any of Aspects 1 through 4, wherein activating the sidelink DRX timer comprises activating an inactivity timer based at least in part on a sidelink control information (SCI) of the first sidelink transmission.

Aspect 6: The method of any of Aspects 1 through 5, further comprising: receiving, from the Rx UE, a negative acknowledgement (NACK) based at least in part on the first sidelink transmission; and wherein activating the sidelink DRX timer comprises activating a hybrid automatic repeat request (HARQ) round trip time (RTT) timer based at least in part on the NACK. wherein activating the sidelink DRX timer comprises activating a hybrid automatic repeat request (HARQ) round trip time (RTT) timer based at least in part on the NACK.

Aspect 7: The method of Aspect 6, further comprising: switching to an inactive state for sidelink communications while the HARQ_RTT timer is running.

Aspect 8: The method of Aspect 6, wherein resource reselection is not triggered based at least in part on a preemption, a dropped transmission, or a collision while the HARQ_RTT timer is running.

Aspect 9: The method of Aspect 6, wherein a value associated with the HARQ RTT timer is based at least in part on a common value for a plurality of UEs.

Aspect 10: The method of Aspect 6, wherein activating the HARQ_RTT timer comprises activating the HARQ_RTT timer based at least in part on stopping an inactivity timer.

Aspect 11: The method of any of Aspects 1 through 10, wherein activating the sidelink DRX timer comprises activating a hybrid automatic repeat request (HARQ) retransmission timer based at least in part on an expiry of a HARQ round trip time (RTT) timer.

Aspect 12: The method of Aspect 11, further comprising: determining, while the HARQ retransmission timer is running, a reselected resource for a second sidelink transmission reserved by sidelink control information (SCI) transmitted with the first sidelink transmission, wherein the reselected resource is before or after in time an originally reserved resource associated with the SCI.

Aspect 13: The method of Aspect 12, further comprising: performing, to the Rx UE, the second sidelink transmission, wherein the HARQ retransmission timer is deactivated after the second sidelink transmission is performed.

Aspect 14: The method of any of Aspects 1 through 13, wherein the Rx UE is one of multiple Rx UEs associated with the destination ID.

Aspect 15: The method of any of Aspects 1 through 14, wherein the destination ID is a layer 2 destination ID for a broadcast service.

Aspect 16: The method of any of Aspects 1 through 15, wherein activating the sidelink DRX timer comprises activating an inactivity timer after performing the first sidelink transmission that reserves a second sidelink transmission.

Aspect 17: The method of any of Aspects 1 through 16, wherein activating the sidelink DRX timer comprises activating an inactivity timer based at least in part on a resource reselection for a retransmission or a new transmission being enabled.

Aspect 18: A method of wireless communication performed by a receiving (Rx) user equipment (UE), comprising: receiving, from a transmitting (Tx) UE, a first sidelink transmission in an on duration of a sidelink discontinuous reception (DRX) cycle associated with a sidelink DRX configuration; and activating a sidelink DRX timer based at least in part on the sidelink DRX configuration, wherein the sidelink DRX configuration is associated with a destination identifier (ID) and one or more source IDs are associated with the destination ID, and wherein the sidelink DRX timer is operated per a pair of source ID and destination ID.

Aspect 19: The method of Aspect 18, wherein the destination ID is a layer 2 destination ID for a groupcast.

Aspect 20: The method of any of Aspects 18 through 19, wherein the source ID in the one or more source IDs is associated with the Tx UE, and the one or more source IDs corresponds to one or more Tx UEs.

Aspect 21: The method of any of Aspects 18 through 20, wherein activating the sidelink DRX timer comprises activating an on duration timer based at least in part on entering the on duration of the sidelink DRX cycle.

Aspect 22: The method of any of Aspects 18 through 21, wherein activating the sidelink DRX timer comprises activating an inactivity timer based at least in part on a sidelink control information (SCI) of the first sidelink transmission.

Aspect 23: The method of any of Aspects 18 through 22, further comprising: transmitting, to the Tx UE, a negative acknowledgement (NACK) based at least in part on the first sidelink transmission; and wherein activating the sidelink DRX timer comprises activating a hybrid automatic repeat request (HARQ) round trip time (RTT) timer based at least in part on the NACK. wherein activating the sidelink DRX timer comprises activating a hybrid automatic repeat request (HARQ) round trip time (RTT) timer based at least in part on the NACK.

Aspect 24: The method of Aspect 23, wherein a value associated with the HARQ_RTT timer is based at least in part on a common value for a plurality of UEs.

Aspect 25: The method of Aspect 23, wherein activating the HARQ_RTT timer comprises activating the HARQ_RTT timer based at least in part on stopping an inactivity timer.

Aspect 26: The method of any of Aspects 18 through 25, wherein activating the sidelink DRX timer comprises activating a hybrid automatic repeat request (HARQ) retransmission timer based at least in part on an expiry of a HARQ round trip time (RTT) timer.

Aspect 27: The method of Aspect 26, further comprising: monitoring, while the HARQ retransmission timer is running, for a scheduling sidelink control information for a second sidelink transmission.

Aspect 28: The method of Aspect 27, further comprising: deactivating the HARQ retransmission timer after receiving the second sidelink transmission from the Tx UE.

Aspect 29: The method of any of Aspects 18 through 28, wherein the Rx UE is one of multiple Rx UEs associated with the destination ID.

Aspect 30: The method of any of Aspects 18 through 29, further comprising: transmitting, to the Tx UE, an acknowledgement (ACK) based at least in part on the first sidelink transmission; and wherein activating the sidelink DRX timer comprises activating a hybrid automatic repeat request (HARQ) round trip time (RTT) timer based at least in part on the ACK. wherein activating the sidelink DRX timer comprises activating a hybrid automatic repeat request (HARQ) round trip time (RTT) timer based at least in part on the ACK.

Aspect 31: The method of Aspect 30, wherein the HARQ_RTT timer is deactivated based at least in part on the ACK.

Aspect 32: The method of any of Aspects 18 through 31, wherein the destination ID is a layer 2 destination ID for a broadcast service.

Aspect 33: The method of any of Aspects 18 through 32, wherein activating the sidelink DRX timer comprises activating an inactivity timer after receiving, from the Tx UE, the first sidelink transmission that reserves a second sidelink transmission.

Aspect 34: A method of wireless communication performed by a first user equipment (UE), comprising: performing, to a second UE, a sidelink transmission in an on duration of a sidelink discontinuous reception (DRX) cycle associated with a sidelink DRX configuration; and activating a sidelink DRX timer based at least in part on the sidelink DRX configuration, wherein the sidelink DRX configuration is associated with a quality of service (QoS) profile, and wherein the sidelink DRX timer is operated per destination identifier (ID) and per each source ID associated with the destination ID.

Aspect 35: The method of Aspect 34, wherein the destination ID is associated with a group for groupcast or a service for broadcast.

Aspect 36: The method of any of Aspects 34 through 35, wherein the source ID is associated with a transmitting UE.

Aspect 37: The method of any of Aspects 34 through 36, wherein the first UE is a transmitting UE and the second UE is a receiving UE.

Aspect 38: The method of any of Aspects 34 through 37, wherein the first UE is a receiving UE and the second UE is a transmitting UE at different time occasions in the on duration of the sidelink DRX cycle.

Aspect 39: The method of any of Aspects 34 through 38, wherein the sidelink DRX timer is one of: an inactivity timer, a hybrid automatic repeat request (HARQ) round trip time (RTT) timer, or a HARQ retransmission timer.

Aspect 40: An apparatus for wireless communication at a device, comprising a processor; memory coupled with the processor; and instructions stored in the memory and executable by the processor to cause the apparatus to perform the method of one or more Aspects of Aspects 1-17.

Aspect 44: A device for wireless communication, comprising a memory and one or more processors coupled to the memory, the memory and the one or more processors configured to perform the method of one or more Aspects of Aspects 1-17.

Aspect 45: An apparatus for wireless communication, comprising at least one means for performing the method of one or more Aspects of Aspects 1-17.

Aspect 46: A non-transitory computer-readable medium storing code for wireless communication, the code comprising instructions executable by a processor to perform the method of one or more Aspects of Aspects 1-17.

Aspect 47: A non-transitory computer-readable medium storing a set of instructions for wireless communication, the set of instructions comprising one or more instructions that, when executed by one or more processors of a device, cause the device to perform the method of one or more Aspects of Aspects 1-17.

Aspect 48: An apparatus for wireless communication at a device, comprising a processor; memory coupled with the processor; and instructions stored in the memory and executable by the processor to cause the apparatus to perform the method of one or more Aspects of Aspects 18-33.

Aspect 49: A device for wireless communication, comprising a memory and one or more processors coupled to the memory, the memory and the one or more processors configured to perform the method of one or more Aspects of Aspects 19-33.

Aspect 50: An apparatus for wireless communication, comprising at least one means for performing the method of one or more Aspects of Aspects 19-33.

Aspect 51: A non-transitory computer-readable medium storing code for wireless communication, the code comprising instructions executable by a processor to perform the method of one or more Aspects of Aspects 19-33.

Aspect 52: A non-transitory computer-readable medium storing a set of instructions for wireless communication, the set of instructions comprising one or more instructions that, when executed by one or more processors of a device, cause the device to perform the method of one or more Aspects of Aspects 19-33.

Aspect 53: An apparatus for wireless communication at a device, comprising a processor; memory coupled with the processor; and instructions stored in the memory and executable by the processor to cause the apparatus to perform the method of one or more Aspects of Aspects 34-39.

Aspect 54: A device for wireless communication, comprising a memory and one or more processors coupled to the memory, the memory and the one or more processors configured to perform the method of one or more Aspects of Aspects 34-39.

Aspect 55: An apparatus for wireless communication, comprising at least one means for performing the method of one or more Aspects of Aspects 34-39.

Aspect 56: A non-transitory computer-readable medium storing code for wireless communication, the code comprising instructions executable by a processor to perform the method of one or more Aspects of Aspects 34-39.

Aspect 57: A non-transitory computer-readable medium storing a set of instructions for wireless communication, the set of instructions comprising one or more instructions that, when executed by one or more processors of a device, cause the device to perform the method of one or more Aspects of Aspects 34-39.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a transmitting (Tx) user equipment (UE), comprising:
performing, to a receiving (Rx) UE, a first sidelink transmission in an on duration of a sidelink discontinuous reception (DRX) cycle; and
activating a sidelink DRX timer corresponding to the sidelink DRX cycle, wherein the sidelink DRX timer is set with a value for a destination identifier (ID), wherein one or more source IDs are associated with the destination ID, wherein the sidelink DRX timer is operated per a pair of source ID and destination ID, and wherein activating the sidelink DRX timer comprises activating a hybrid automatic repeat request (HARQ) retransmission timer based at least in part on an expiry of a HARQ round trip time (RTT) timer.

2. The method of claim 1, wherein the destination ID is a layer 2 destination ID for a groupcast.

3. The method of claim 1, wherein the source ID in the one or more source IDs is associated with the Tx UE, and the one or more source IDs corresponds to one or more Tx UEs.

4. The method of claim 1, wherein activating the sidelink DRX timer further comprises activating an on duration timer based at least in part on entering the on duration.

5. The method of claim 1, wherein activating the sidelink DRX timer further comprises activating an inactivity timer based at least in part on a sidelink control information (SCI) of the first sidelink transmission.

6. The method of claim 1, further comprising:
receiving, from the Rx UE, a negative acknowledgement (NACK) based at least in part on the first sidelink transmission; and
wherein activating the sidelink DRX timer further comprises activating the HARQ RTT timer based at least in part on the NACK.

7. The method of claim 6, wherein a value associated with the HARQ RTT timer is based at least in part on a common value for a plurality of UEs.

8. The method of claim 6, wherein activating the HARQ RTT timer comprises activating the HARQ RTT timer based at least in part on stopping an inactivity timer.

9. The method of claim 1, further comprising:
determining, while the HARQ retransmission timer is running, a reselected resource for a second sidelink transmission reserved by sidelink control information (SCI) transmitted with the first sidelink transmission, wherein the reselected resource is before or after in time an originally reserved resource associated with the SCI.

10. The method of claim 9, further comprising:
performing, to the Rx UE, the second sidelink transmission, wherein the HARQ retransmission timer is deactivated after the second sidelink transmission is performed.

11. The method of claim 1, wherein the Rx UE is one of multiple Rx UEs associated with a group for groupcast, and wherein the destination ID is associated with the group.

12. The method of claim 1, wherein the destination ID is a layer 2 destination ID for a broadcast service.

13. The method of claim 1, wherein activating the sidelink DRX timer further comprises activating an inactivity timer after performing the first sidelink transmission that reserves a second sidelink transmission.

14. A method of wireless communication performed by a receiving (Rx) user equipment (UE), comprising:
receiving, from a transmitting (Tx) UE, a first sidelink transmission in an on duration of a sidelink discontinuous reception (DRX) cycle; and
activating a sidelink DRX timer corresponding to the sidelink DRX cycle, wherein the sidelink DRX timer is set with a value for a destination identifier (ID), wherein one or more source IDs are associated with the destination ID, wherein the sidelink DRX timer is operated per a pair of source ID and destination ID, and wherein activating the sidelink DRX timer comprises activating a hybrid automatic repeat request (HARQ) retransmission timer based at least in part on an expiry of a HARQ round trip time (RTT) timer.

15. The method of claim 14, wherein the destination ID is a layer 2 destination ID for a groupcast.

16. The method of claim 14, wherein the source ID in the one or more source IDs is associated with the Tx UE, and the one or more source IDs corresponds to one or more Tx UEs.

17. The method of claim 14, wherein activating the sidelink DRX timer further comprises activating an on duration timer based at least in part on entering the on duration.

18. The method of claim 14, wherein activating the sidelink DRX timer further comprises activating an inactivity timer based at least in part on a sidelink control information (SCI) of the first sidelink transmission.

19. The method of claim 14, further comprising:
transmitting, to the Tx UE, a negative acknowledgement (NACK) based at least in part on the first sidelink transmission; and
wherein activating the sidelink DRX timer further comprises activating the HARQ RTT timer based at least in part on the NACK.

20. The method of claim 19, wherein a value associated with the HARQ RTT timer is based at least in part on a common value for a plurality of UEs.

21. The method of claim 19, wherein activating the HARQ RTT timer further comprises activating the HARQ RTT timer based at least in part on stopping an inactivity timer.

22. The method of claim 14, further comprising:
monitoring, while the HARQ retransmission timer is running, for a scheduling sidelink control information for a second sidelink transmission; and
deactivating the HARQ retransmission timer after receiving the second sidelink transmission from the Tx UE.

23. The method of claim 14, wherein activating the sidelink DRX timer further comprises activating an inactivity timer after receiving, from the Tx UE, the first sidelink transmission that reserves a second sidelink transmission.

24. A method of wireless communication performed by a first user equipment (UE), comprising:
performing, to a second UE, a sidelink transmission in an on duration of a sidelink discontinuous reception (DRX) cycle associated with a sidelink DRX configuration, wherein the sidelink DRX configuration is associated with a quality of service (QOS) profile; and
activating a sidelink DRX timer corresponding to the sidelink DRX cycle, wherein the sidelink DRX timer is operated per destination identifier (ID) and per each source ID associated with the destination ID, wherein the sidelink DRX timer is set with a value in accordance with the QoS profile, and wherein activating the sidelink DRX timer comprises activating a hybrid automatic repeat request (HARQ) retransmission timer.

25. The method of claim 24, wherein the destination ID is associated with a group for groupcast or a service for broadcast, and wherein the source ID is associated with a transmitting UE.

26. The method of claim 24, wherein the first UE is a transmitting UE and the second UE is a receiving UE, or wherein the first UE is a receiving UE and the second UE is a transmitting UE at different time occasions in the on duration.

27. A transmitting (Tx) user equipment (UE) for wireless communication, comprising:
a memory; and
one or more processors, coupled to the memory, configured to:
perform, to a receiving (Rx) UE, a first sidelink transmission in an on duration of a sidelink discontinuous reception (DRX) cycle; and
activate a sidelink DRX timer corresponding to the sidelink DRX cycle, wherein the sidelink DRX timer is set with a value for a destination identifier (ID), wherein multiple source IDs are associated with the destination ID, wherein the sidelink DRX timer is operated per source ID in the multiple source IDs, and wherein to activate the sidelink DRX timer, the one or more processors are configured to activate a hybrid automatic repeat request (HARQ) retransmission timer based at least in part on an expiry of a HARQ round trip time (RTT) timer.

28. The Tx UE of claim 27, wherein:
the destination ID is a layer 2 destination ID for a groupcast; and
the source ID in the multiple source IDs is associated with the Tx UE, and the multiple source IDs correspond to multiple Tx UEs.

29. The Tx UE of claim 27, wherein activating the sidelink DRX timer further comprises activating an on duration timer based at least in part on entering the on duration.

30. The Tx UE of claim 27, wherein the destination ID is a layer 2 destination ID for a broadcast service.

* * * * *